(12) United States Patent
Goto

(10) Patent No.: US 9,191,462 B2
(45) Date of Patent: Nov. 17, 2015

(54) DISPLAY APPARATUS

(75) Inventor: Ryo Goto, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 878 days.

(21) Appl. No.: 13/448,094

(22) Filed: Apr. 16, 2012

(65) Prior Publication Data

US 2012/0204097 A1    Aug. 9, 2012

Related U.S. Application Data

(63) Continuation of application No. 11/342,303, filed on Jan. 27, 2006, now Pat. No. 8,302,016.

(30) Foreign Application Priority Data

Jan. 28, 2005  (JP) ................................. 2005-021715
Jan. 28, 2005  (JP) ................................. 2005-022229

(51) Int. Cl.
G06F 3/048   (2013.01)
H04L 29/08   (2006.01)
G06F 3/0481  (2013.01)
G06F 17/30   (2006.01)

(52) U.S. Cl.
CPC .............. H04L 67/36 (2013.01); *G06F 3/0481* (2013.01); *G06F 17/30899* (2013.01); *H04L 67/2823* (2013.01)

(58) Field of Classification Search
CPC .. G06F 3/0481; H04L 29/08072; H04L 29/06
USPC ........................................................ 715/748
See application file for complete search history.

(56) References Cited

U.S. PATENT DOCUMENTS

| | | | |
|---|---|---|---|
| 5,339,391 A | 8/1994 | Wroblewski et al. | 345/607 |
| 5,781,785 A | 7/1998 | Rowe et al. | 715/234 |
| 5,806,079 A | 9/1998 | Rivette et al. | 715/210 |
| 5,860,074 A | 1/1999 | Rowe et al. | 715/235 |
| 6,369,811 B1 | 4/2002 | Graham et al. | 715/764 |
| 6,457,030 B1 | 9/2002 | Adams et al. | |
| 6,533,822 B2 | 3/2003 | Kupiec | 715/253 |
| 6,647,534 B1 | 11/2003 | Graham | 715/205 |
| 6,941,382 B1 | 9/2005 | Tuli | 709/247 |
| 7,068,381 B1 | 6/2006 | Tuli | 358/1.15 |

(Continued)

FOREIGN PATENT DOCUMENTS

| | | |
|---|---|---|
| JP | 09237174 A | 9/1997 |
| JP | 11-219313 | 8/1999 |

(Continued)

OTHER PUBLICATIONS

Kazuhito Sato, "A 'truly usable' technique beyond Tips & Tricks" (with English translation) HTML MANIAX, internet magazine, No. 94, p. 187, 2007.

(Continued)

*Primary Examiner* — David Phantana Angkool
(74) *Attorney, Agent, or Firm* — Studebaker & Brackett PC

(57) ABSTRACT

A portable terminal includes a page storage section, in which a Web page is temporarily stored while the Web page is being browsed. Thus, when the same Web page is browsed the next time, a control section compares the Web page with the previously stored page contents and moves the display range of the page, so that the updated portion is displayed at a predetermined position on a display section.

23 Claims, 20 Drawing Sheets

(56) References Cited

U.S. PATENT DOCUMENTS

| | | |
|---|---|---|
| 7,103,851 B1 | 9/2006 | Jaeger .......................... 715/786 |
| 7,191,211 B2 | 3/2007 | Tuli .............................. 709/203 |
| 7,228,492 B1 | 6/2007 | Graham ........................ 715/234 |
| 7,343,550 B2* | 3/2008 | Saidenberg et al. .......... 715/736 |
| 7,356,570 B1 | 4/2008 | Tuli .............................. 709/217 |
| 7,360,173 B2 | 4/2008 | Tuli .............................. 715/851 |
| 7,509,374 B2 | 3/2009 | Trinh et al. ................... 709/203 |
| 8,219,900 B2* | 7/2012 | Curtis et al. .................. 715/234 |
| 8,302,016 B2* | 10/2012 | Goto ............................. 715/748 |
| 8,635,521 B2* | 1/2014 | Fleishman et al. ........... 715/234 |
| 8,775,930 B2* | 7/2014 | Curtis et al. .................. 715/273 |
| 8,793,650 B2* | 7/2014 | Hilerio et al. ................. 717/115 |
| 8,918,712 B2* | 12/2014 | Nario et al. ................... 715/239 |
| 8,935,705 B2* | 1/2015 | Martin .......................... 718/106 |
| 2002/0030844 A1 | 3/2002 | Tuli |
| 2002/0054132 A1 | 5/2002 | Meier et al. .................. 345/784 |
| 2002/0138331 A1 | 9/2002 | Hosea et al. ................... 705/10 |
| 2003/0020962 A1 | 1/2003 | Tanimoto |
| 2003/0149935 A1 | 8/2003 | Takizawa et al. |
| 2004/0070605 A1 | 4/2004 | Huang et al. ................. 345/744 |
| 2004/0139208 A1 | 7/2004 | Tuli |
| 2004/0150644 A1 | 8/2004 | Kincaid et al. |

FOREIGN PATENT DOCUMENTS

| | | |
|---|---|---|
| JP | 11-249823 | 9/1999 |
| JP | 2001-034525 | 2/2001 |
| JP | 2001-060206 | 3/2001 |
| JP | 2002259199 A | 9/2002 |
| JP | 2002259289 A | 9/2002 |
| JP | 2003037699 A | 2/2003 |
| JP | 2003-122770 | 4/2003 |
| JP | 2003-281128 | 10/2003 |
| JP | 2004-021521 | 1/2004 |
| JP | 2004096482 A | 3/2004 |
| JP | 2004234654 A | 8/2004 |
| JP | 2004348472 A | 12/2004 |
| WO | WO 2004/051504 | 6/2004 |

OTHER PUBLICATIONS

Fred Douglis et al., "Tracking and Viewing Changes on the Web" 1996 USENIX Technical Conference, pp. 1-13, Jan. 1996, retrieved from the Internet: URL: http://research.microsoft.com/pubs/68538/usenix96.pdf.

Fred Douglis, "Experiences with the AT&T Internet Difference Engine" Proceedings of the 22nd International Conference for the Resource Management & Performance Evaluation of Enterprise Computing System, pp. 1-14, Jan. 1996.

Japanese language office action dated Apr. 3, 2012 and its English language translation issued in corresponding Japanese application 2010103652.

Japanese language office action dated Mar. 27, 2012 and its English language translation issued in corresponding Japanese application 2010100655.

Japanese language office action dated Jan. 10, 2012 and its English language translation issued in corresponding Japanese application 2010103652.

Japanese language office action dated Sep. 13, 2011 and its English language translation issued in corresponding Japanese application 2010103652.

Extended European search report dated Apr. 2, 2012 issued in corresponding European application 06001725.8.

Japanese language office action dated Jun. 19, 2012 and its English language translation issued in corresponding Japanese application 2010100655.

European office action dated Jan. 30, 2013 issued in corresponding European application 06001725.8.

Chinese language office action and its English language translation for corresponding Chinese application 200610004754.

Chinese language office action and its English language translation for corresponding Chinese application 200810096273.5.

Chinese language office action and its English language translation for corresponding Chinese application 2005022229.

Japanese language office action and its English language translation for corresponding Japanese application 2005021715.

* cited by examiner (a) WEB PAGE PREVIOUSLY ACQUIRED AND STORED (b) WEB PAGE NEWLY ACQUIRED (a) INITIAL DISPLAY OF RELATED ART (b) INITIAL DISPLAY OF FIRST EMBODIMENT (a) DISPLAY OF LIST OF UPDATED PORTIONS

DISPLAY UPDATED PORTIONS TO PERMIT USER TO SELECT THEM

ESTABLISH (b) DISPLAY UPDATED PORTIONS (a) UPDATING PERFORMED (b) NO UPDATING (c) DETERMINATION DISABLED (a) SOURCE BEFORE UPDATING  (b) SOURCE AFTER UPDATING

FIG. 10A
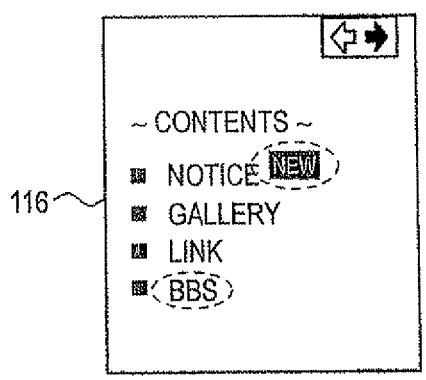
(a) DISPLAY FIRST UPDATED PORTION
FIG. 10B
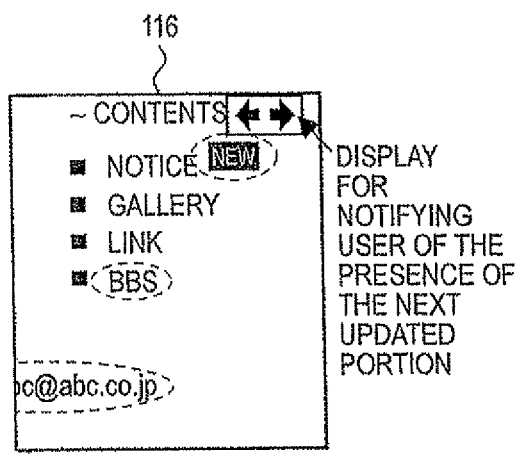
(b) DISPLAY SECOND UPDATED PORTION
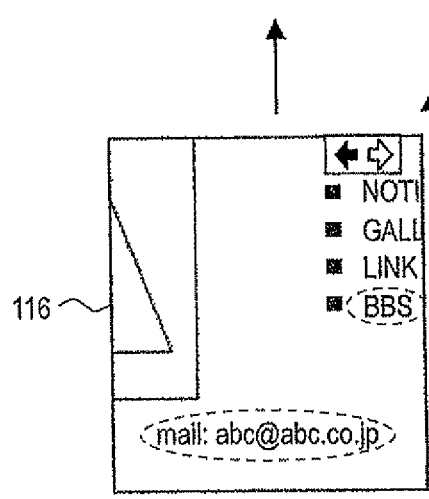
(c) DISPLAY THIRD UPDATED PORTION
FIG. 10C

URL:
[ ALL ▼ ]

CONDITION:
[ CHARACTER STRING ▼ ] ← SELECT CONDITION FROM:
• CHARACTER STRING
• IMAGE/MOVING PICTURE
• CONTROL
• COORDINATES

DISPLAY POSITION:
[ UPPER CENTER ▼ ]

TIME ZONE:
NOT DESIGNATED ▶

(a) SELECT CONDITION "CHARACTER STRING"

CHARACTER STRING:
[ TOPICS ]

STYLE:
NOT DESIGNATED ▶

LINK:
[ NOT DESIGNATED ▼ ]

(b) SETUP OF DETAILED CONDITION

PRIORITY:
→ 1 CHARACTER STRING ("NEWS")
2 COORDINATES (0, 0)

(c) ALLOCATE SECOND PRIORITY

PRIORITY:
1 CHARACTER STRING ("NEWS")
2 CHARACTER STRING ("TOPICS")
3 COORDINATES (0, 0)

(d) PRIORITY AFTER SETUP (a) WEB BROWSING SCREEN (b) CONDITION SETUP MENU SCREEN (c) SELECT RANGE OF CHARACTER STRING FROM CURRENTLY DISPLAYED WEB PAGE (d) SET DISPLAY POSITION ON SCREEN AND OTHER CONDITIONS (d) SET PRIORITY (e) PRIORITY AFTER SETUP (a)
MATCHED CONDITION:
  CHARACTER STRING "TOPICS"
DISPLAY POSITION:
  UPPER LEFT ON SCREEN (b)
MATCHED CONDITION: IMAGE (TAG "img")
DISPLAY POSITION: CENTER ON SCREEN (c)
MATCHED CONDITION:
  TEXT BOX (TAG "input")
DISPLAY POSITION:
  LOWER CENTER ON SCREEN (d)
MATCHED CONDITION:
  COORDINATES (100, 100)
DISPLAY POSITION:
  UPPER LEFT ON SCREEN

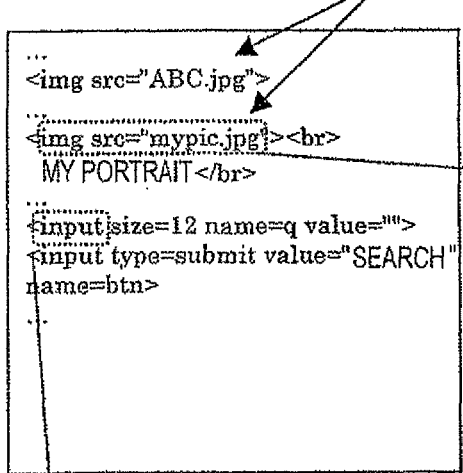

FIG. 19A

PRIOR TO IMAGE "ABC.jpg", READ IMAGE "mypic.jpg" THAT MATCHES A CONDITION

```
...
<img src="ABC.jpg">
<img src="mypic.jpg"><br>
MY PORTRAIT</br>
<input size=12 name=q value="">
<input type=submit value="SEARCH" name=btn>
```

(a) SOURCE OF WEB PAGE

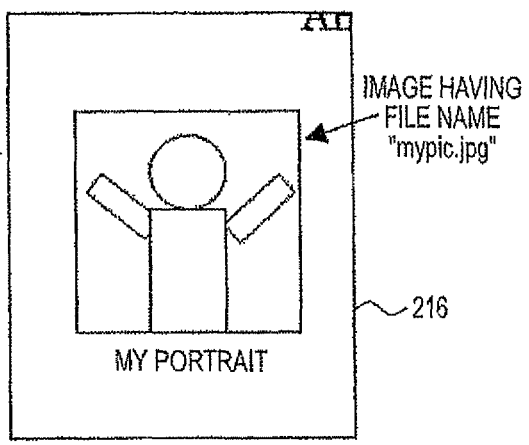

FIG. 19B

IMAGE HAVING FILE NAME "mypic.jpg"

216

MY PORTRAIT (b) WHEN IMAGE IS DISPLAYED IN THE CENTER

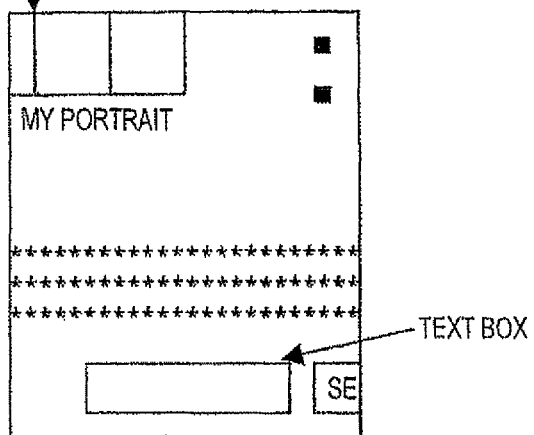

FIG. 19C

MY PORTRAIT

TEXT BOX (c) WHEN TEXT BOX IS DISPLAYED IN THE LOWER CENTER

*FIG. 20A*

| PRIORITY | URL | TIME ZONE | (CONDITION) ELEMENT | CONDITION DATA | POSITION |
|---|---|---|---|---|---|
| 1 | www.aaa.jp | NONE | IMAGE | FILE NAME maypic.jpg | CENTER |
| 2 | NONE | 12:00 - 19:00 | CHARACTER STRING | NEWS | UPPER LEFT |
| 3 | NONE | NONE | CHARACTER STRING | TOPICS | UPPER LEFT |
| 4 | NONE | NONE | CHARACTER STRING | TODAY'S FORTUNE | UPPER LEFT |
| 5 | www.aaa.jp | 5:00 - 9:00 | CONTROL | PUSH BUTTON | LOWER RIGHT |
| 6 | www.bbb.co.jp | NONE | CHARACTER STRING | PHOTOGRAPH | UPPER CENTER |
| 7 | NONE | 20:00 - 23:00 | IMAGE | EXTENSION ".gif" | CENTER |
| 8 | www.aaa.jp | 17:00 - 20:00 | CONTROL | TEXT BOX | LOWER CENTER |
| 9 | www.ccc.ne.jp | NONE | CONTROL | TEXT BOX | LEFT |
| 10 | NONE | NONE | COORDINATES | 0, 0 | UPPER LEFT |

(a) FILTERING BASED ON CONDITIONS AND CONDITION DATA
(EXAMPLE: BROWSE WEB PAGE IN FIG. B6)

*FIG. 20B*

| PRIORITY | URL | TIME ZONE | (CONDITION) ELEMENT | CONDITION DATA | POSITION |
|---|---|---|---|---|---|
| 1 | www.aaa.jp | NONE | IMAGE | FILE NAME maypic.jpg | CENTER |
| 2 | NONE | NONE | CHARACTER STRING | TOPICS | UPPER LEFT |
| 3 | www.aaa.jp | 5:00 - 9:00 | CONTROL | PUSH BUTTON | LOWER RIGHT |
| 4 | www.bbb.co.jp | NONE | CHARACTER STRING | PHOTOGRAPH | UPPER CENTER |
| 5 | www.aaa.jp | 17:00 - 20:00 | CONTROL | TEXT BOX | LOWER CENTER |
| 6 | www.ccc.ne.jp | NONE | CONTROL | TEXT BOX | LEFT |
| 7 | NONE | NONE | COORDINATES | 0, 0 | UPPER LEFT |

(b) PERFORM FILTERING AND SORTING ACCORDING TO URL
(EXAMPLE: BROWSE www.aaa.jp)

| PRIORITY | URL | TIME ZONE | (CONDITION) ELEMENT | CONDITION DATA | POSITION |
|---|---|---|---|---|---|
| 1 | www.aaa.jp | NONE | IMAGE | FILE NAME mypic.jpg | CENTER |
| 2 | www.aaa.jp | 5:00 - 9:00 | CONTROL | PUSH BUTTON | LOWER RIGHT |
| 3 | www.aaa.jp | 17:00 - 20:00 | CONTROL | TEXT BOX | LOWER CENTER |
| 4 | NONE | NONE | CHARACTER STRING | TOPICS | UPPER LEFT |
| 5 | NONE | NONE | COORDINATES | 0, 0 | UPPER LEFT |

(a) PERFORM FILTERING AND SORTING BASED ON TIME ZONE (EXAMPLE: BROWSE AT 18:00)

FIG. 21B

| PRIORITY | URL | TIME ZONE | (CONDITION) ELEMENT | CONDITION DATA | POSITION |
|---|---|---|---|---|---|
| 1 | www.aaa.jp | 17:00 - 20:00 | CONTROL | TEXT BOX | LOWER CENTER |
| 2 | www.aaa.jp | NONE | IMAGE | FILE NAME mypic.jpg | CENTER |
| 3 | NONE | NONE | CHARACTER STRING | TOPICS | UPPER LEFT |
| 4 | NONE | NONE | COORDINATES | 0, 0 | UPPER LEFT |

(b) FINAL TABLE (a) DISPLAY POSITION OF FIRST PRIORITY

INDICATION TO NOTIFY A USER OF THE PRESENCE OF THE NEXT CANDIDATE TO BE PREFERENTIALLY DISPLAYED

USER MANIPULATION OR AUTOMATIC SWITCHING (b) DISPLAY POSITION AT SECOND PRIORITY (c) DISPLAY POSITION OF THIRD PRIORITY (d) DISPLAY POSITION OF FOURTH PRIORITY

↓

TO DISPLAY POSITION AT FIRST PRIORITY

DISPLAY APPARATUS

CROSS-REFERENCE TO RELATED APPLICATIONS

This application is a continuation of U.S. application Ser. No. 11/342,303 filed on Jan. 27, 2006, the entire contents of which are incorporated herein by reference. Also, this application is based upon and claims the benefit of priority under 35 USC 119 from the prior Japanese Applications No. 2005-021715 filed on Jan. 28, 2005 and No. 2005-022229 filed on Jan. 28, 2005, the entire contents of which are incorporated herein by reference.

BACKGROUND OF THE INVENTION

1. Field of the Invention

The present invention relates to a display apparatus that displays Web pages, for example, and that preferentially displays predetermined items in accordance with multiple designated priority conditions.

2. Description of the Related Art

The following first to sixth related art proposed as systems and methods for preferentially displaying predetermined items in accordance with priority conditions.

The first related art is an information system that includes a mobile memory and an information, terminal for accessing the mobile memory. By manipulating the operating section of the information terminal, a user can select one of a plurality of choices displayed on a screen, and can search for desired information. In this case, data related to the selection of choices by the user when accessing desired information are stored in the database of the mobile memory, and are employed to prepare a data input history for that user. Thereafter, when the user next employs the information terminal to search for information, the data input history stored in the mobile memory is referred to and employed for a preferential display of previous choices frequently made by the user.

The second related art is a contents pre-read method for employing priority levels of pages at individual linking destinations to determine the order for the pre-reading of the contents of these pages, and for determining priority levels based on past access frequencies (See, for example, JP-A-11-219313).

The third related art is a screen display control system. According to this system, screen display priorities used for displaying screens are provided in accordance with priority item data selected from a priority display selection menu, data about the date and time where the item was selected, and record data as to when the menu was actually selected. Then, the display positions of the menu items for which the priorities are allocated are changed, and the menu items are thereafter displayed on the screen of the terminal.

The fourth related art is a display method whereby, at the time of an access by a user, a profile of the user is examined and the cursor is positioned at an information element (a hyperlink) of information, which is determined in accordance with the times selected in the past and the tastes exhibited by the user.

The fifth related art is a page pre-read system that includes: a link table, wherein a list of linking destinations for the individual Web pages is entered together with selection frequencies that are based on the previous history; a table updating section, for updating the contents of the link table when a link is selected; and a page pre-reading section for, based on the contents of the link table, pre-reading data at a URL that, in the past, was frequently selected (See, for example, JP-A-11-249823.).

The third related art is a display method whereby, when a Web page is updated, the updated Web page is compared with a cache file, and the updated text data portion is displayed so as to be identified with the other text data portion (See, for example, JP-A-2001-34525.).

JP-A-11-219313, JP-A-11-249823 and JP-A-2001-34525 are referred to as related art.

As the use of portable terminals, such as cellular phones and PDAs, has spread, increasingly there are cases wherein cellular phones are used to browse Web pages via the Internet.

Most of these Web pages are prepared on the assumption that they are to be browsed by apparatuses, such as personal computers, that have large display devices, and thus, are usually not appropriate for reading using portable terminals having only small display sections.

Further, small portable terminals, such as cellular phones, have only limited input means. For a personal computer, it is assumed that a pointing device, such as a mouse, is provided as an input device, while for many cellular phones, only a small number of keys are available for browsing Web pages.

As a method for browsing a large Web page, or an image, using a small screen, a Web page is reduced so that the entire width of the page, or the complete page, can be fitted into the display section.

However, many Web pages are much larger than the display section of a cellular phone.

Therefore, according to this browsing method, when a Web page is reduced so as to fit a display section, the reduction rate is too large for characters on a page to be read.

Furthermore, when a Web page, created for display by a personal computer, is browsed using a cellular phone that has only a small display device, in many cases only a not very important portion (frequently the upper left portion) is initially displayed, and a user must scroll the screen.

Thus, when a user browses a large Web page using a cellular phone, the user, in order to read information outside the display range of the display section, must scroll the screen by pressing a key many times. This is a disadvantage, in that the user is forced to repeatedly perform a troublesome operation.

Therefore, the above described methods are proposed for preferentially displaying predetermined items in accordance with a priority order.

However, according to the related art for displaying items in priority order, since priorities are allocated in accordance with historical selection times and access frequencies, a highly important item of information, truly needed by a user, is not always displayed. Further, this related art can not provide a mechanism for displaying, when no information element is available that satisfies the requirements for an item of the highest priority, displaying an information element of the second highest priority.

Further, there is a case wherein an information element that on a specific page is granted the highest priority is not even present on another page, and one wherein an information element that on a specific page has a low priority has the highest on another page. However, according to the related art, depending on the situation, priorities can not be designated and these demands can not be coped with.

That is, the related art can not display information that initially is highly important to a user, so that the user either has trouble identifying useful data, or must perform a troublesome scroll operation. Therefore, a disadvantage of the related art is that necessary information can not be displayed rapidly.

SUMMARY OF THE INVENTION

An object of the present invention is to provide a display apparatus that enables to display necessary information rapidly, so that a user does not fail to identify pertinent data, or need not perform a troublesome scroll operation.

The invention provides a display apparatus, having: an acquisition section which acquires Web page information including a plurality of elements; a storage section which stores at least a part of Web page information acquired by the acquisition section; a display section which displays Web page information acquired by the acquisition section; and a control section which compares new Web page information acquired by the acquisition section with Web page information previously acquired from an address identical with that of the new Web page information and stored in the storage section, and which controls to display a changed element in the new Web page information at a predetermined position on the display section.

In the display apparatus, the control section controls to display the changed element at the predetermined position, in accordance with priorities designated based on a type of change.

In the display apparatus, when there is a plurality of the changed elements, the control section treats the plurality of the changed elements as a single change of element.

In the display apparatus, the control section treats a change of numbers as no change.

In the display apparatus, when the number of the changed elements is greater than a predetermined count, the control section controls not to display the changed elements at predetermined position.

The display apparatus further has a designation section which designates a position for displaying the changed element.

In the display apparatus, the control section calculates a scroll distance to display the changed element at the predetermined position, and controls to display the changed element at a position separated from an initial position by the calculated scroll distance.

In the display apparatus, when predetermined Web page information is acquired, the control section compares the predetermined Web page information with Web page information previously acquired from an address identical with that of the predetermined Web page information and stored in the storage section.

The display apparatus further has a switching section which switches a display of predetermined Web page information to display an element of the highest priority and an element of a low priority at the predetermined position.

In the display apparatus, the control section controls to preferentially display an element in predetermined Web page information that is determined to be changed first at a predetermined position.

In the display apparatus, the control section does not treat a changed element as to be detected when a link to another Web page is set in the changed element in a displayed Web page.

According to the display apparatus, required information is rapidly displayed, so that a user does not fail to identify data, or need not perform a troublesome scroll operation.

The invention also provides a display apparatus, having: an acquisition section which acquires Web page information including a plurality of elements; and a display section which displays Web page information acquired by the acquisition section, wherein the display section displays a predetermined element designated for each Web page information at a predetermined position, in accordance with priorities.

The invention also provides a display apparatus, having: an acquisition section which acquires Web page information including a plurality of elements; a storage section which stores priority information including a plurality of pairs of address designation information for designating address information and designation information for designating one element correlated with the address designation information; an extraction section which extracts, from the priority information, designation information correlated with address designation information designating address information of the Web page information acquired by the acquisition section; a search section which searches through the Web page information acquired by the acquisition section to find an element designated by the designation information extracted by the extraction section; and a display section which displays the element searched by the searching section at a predetermined position.

In the display apparatus, the priority information includes priority level information indicating a display priority correlated with the address designation information and/or the designation information, the extraction section extracts, from the priority information, a plurality of designation information correlated with the address designation information for designating address information of the Web page information acquired by the acquisition section, the search section searches through the Web page information acquired by the acquisition section to find a plurality of elements correlated with each of the plurality of the designation information extracted by extraction section, and the display section displays an element of the highest priority among the elements searched by the search section at the predetermined position.

In the display apparatus, the priority information includes position information indicating a predetermined position that corresponds to the address designation information and/or the designation information, and the display section displays the element extracted by the extraction section at a predetermined position represented by the position information.

The display apparatus further has a section which sets the priority information.

In the display apparatus, the address designation information includes a predetermined character string, when a character string constituting address information for the acquired Web page information includes a character string preparing address designation information in the priority information, the extraction section extracts designation information correlated with the address designation information in the priority information, the searching section searches the acquired Web page information to find an element designated by the extracted designation information, and the display section displays the searched element at a predetermined position.

The display apparatus further has a calculation section which calculates a scroll distance to display the searched element at a predetermined position, wherein the display section displays the searched element at a position separated from an initial position by the calculated scroll distance.

In the display apparatus, when a browser is started, the display section displays an element of the highest priority at the predetermined position.

The display apparatus further has a switching section which switches a display of predetermined Web page information to display an element of the highest priority and an element of a low priority at the predetermined position.

In the display apparatus, the display section preferentially displays an element in predetermined Web page information that is determined to be changed first as an element of the highest priority.

Preferably, the display section compares the acquired Web page information with a designated priority condition, detects, as a priority candidate to be displayed, a portion that matches the priority condition, and increases the priority level of a candidate that is detected, earlier.

According to the display apparatus, required information is rapidly displayed, so that a user does not fail to identify data, or need not perform a troublesome scroll operation.

BRIEF DESCRIPTION OF THE DRAWINGS

FIGS. 10A, 10B and 10C are diagrams showing shifting of a display position;

FIGS. 14A to 14D are diagrams showing example screens, displayed on a display section, on which a control section of the second embodiment permits a user to designate a priority condition (a display condition) that the control section stores;

FIGS. 19A to 19C are diagrams for explaining an example process for detecting a priority condition according to the second embodiment;

FIGS. 20A and 20B are diagrams for explaining the process for generating condition tables according to the second embodiment;

FIGS. 21A and 21B are diagrams for explaining the process for generating condition tables according to the second embodiment.

DETAILED DESCRIPTION OF THE PREFERRED EMBODIMENTS

Embodiments of the present invention will now be described while referring to the accompanying drawings.

First Embodiment

Figure 1:
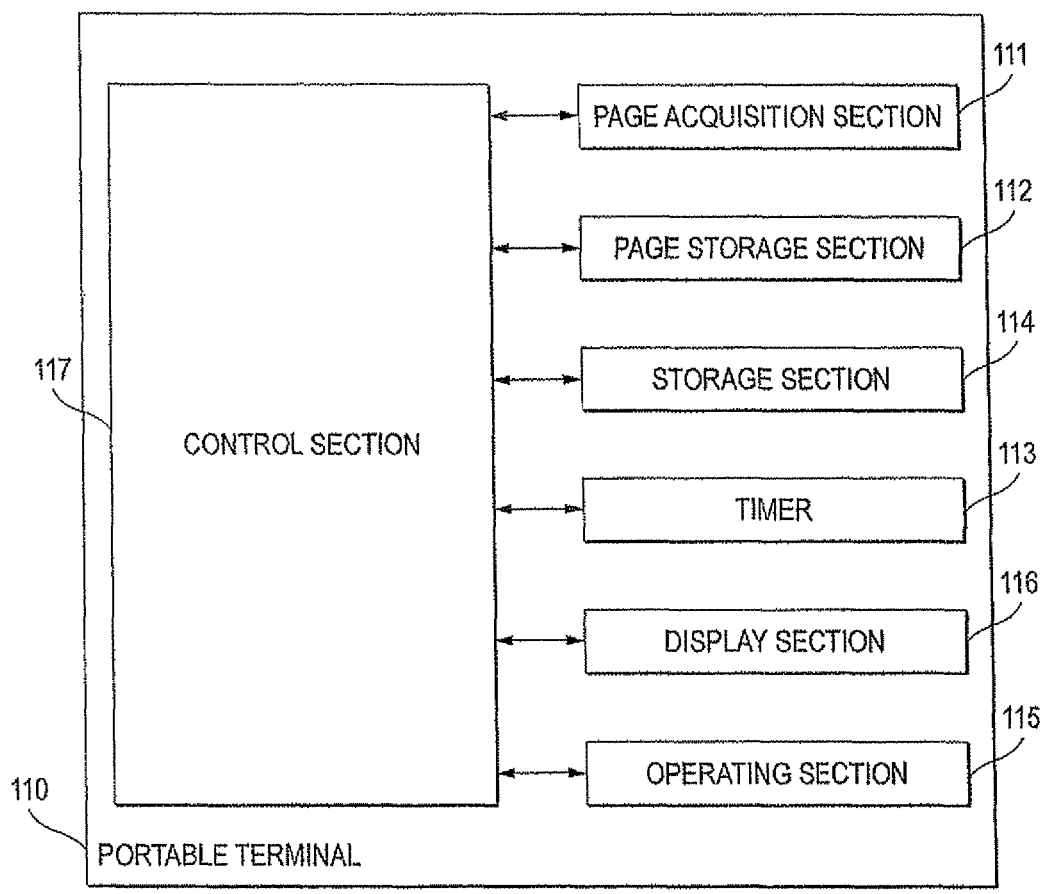
FIG. 1 is a block diagram showing the configuration of a portable terminal that employs a display apparatus according to a first embodiment of the present invention.

FIG. 1 is a block diagram showing a portable terminal that employs a display apparatus according to a first embodiment of the present invention.

A portable terminal 110 for the first embodiment is an apparatus wherein browser software is mounted to enable the browsing of Web pages. Although the portable terminal 110 has only a small display section, this apparatus preferentially displays, on the display section, a portion that includes important information for a user, without the user being required to perform a scroll operation.

The portable terminal 110 can, for example, be a cellular phone or a PDA. And depicted in FIG. 1 are the functions, according to the present invention, performed by such a display apparatus when serving as an apparatus for browsing Web pages. For the first embodiment, the explanation given will mainly concern the operation of a display apparatus when serving as a browsing apparatus.

According to the function of the portable terminal 110 of the first embodiment, predetermined Web page information is acquired and is stored. New page information is compared with page information that is stored, and when there is an element that is updated (changed), the updated element is displayed at a predetermined position and is highlighted, for example.

Depending on the updating type, the portable terminal 110 displays an element at a predetermined position, while allocating a priority.

The updating type includes NEW, update, fresh, title change and change to another element or another item.

When there are a plurality of updated elements, updating of these elements can be regarded as the updating of a single element, so that a change of a number (or numbers) can be regarded as not being updating. Further, an element on the predetermined Web page that is determined to be updated first is regarded as an element of the highest priority.

When the number of the updated elements is greater than a predetermined count, the portable terminal 110 does not perform an operation for displaying the updated elements at predetermined positions.

Furthermore, in the first embodiment, the portable terminal 110 has a function that can designate positions for the display of the elements, and the center, upper left and the upper right on the display screen, for example, can be designated as display positions.

The portable terminal 110 of the first embodiment also has a function for calculating a scroll distance required to display an element at a predetermined position, and for displaying an updated element at a position separated from the initial position by the acquired scroll distance.

In addition, the portable terminal 110 of the first embodiment has a function for switching a display, so that on a predetermined Web page, an element of the highest priority is displayed, and an element of a low priority is displayed at a predetermined position. That is, the portable terminal 110 has a function for, in consonance with user manipulation, sequentially changing the display of elements of lower priority levels.

As described above, the portable terminal 110 has a function for changing the display position in the order of the priority levels; however, this display switching may be performed either by user manipulation or automatically after a predetermined period of time has elapsed.

Furthermore, the portable terminal 110 has a function for employing animations to visually display the state wherein a display position is moved to a next position.

The portable terminal 110 also includes the following functions:

a function whereby, when a predetermined number or more of updated portions are present on a Web page, it is determined that the Web page is renewed, and the initial scroll for displaying the updated portions is not performed;

a function for displaying a Web page while reducing the size of the entire Web page to present for a user the positions of updated portions, and for switching the display positions so that an updated portion selected by the user is displayed at the original magnification rate;

a function for, when there are no updated portions, displaying a notice to that effect using an icon or a message;

a function for, when a Web page, acquired in the past, is to be compared but is not present in the page storage section, displaying a notice to that effect using an icon or a message; and a function whereby, when pages are to be compared, and when a link to a URL (Uniform Resource Locator), of a domain that differs from the Web page currently being browsed, is designated for a updated portion, this portion is not regarded as an updated portion.

An explanation will now be given, sequentially, for the structures and functions of the individual sections of the portable terminal 110 of the first embodiment, the initial Web page display operation, the operation performed upon receiving a display candidate switching request, an example Web page layout and an example updated portion, an example initial display provided when a Web page is browsed, an example display for a list of updated portions, an example display for the presence/absence of updating, an example shifting of a display position using animations, an example process for detecting an updated portion and an example process for shifting a display position.

As shown in FIG. 1, the portable terminal 110 includes: a page acquisition section 111, a page storage section 112, a timer 113, a storage section 114, an operating section 115, a display section 116 and a control section 117.

The page acquisition section 111 has a function for using a communication function to acquire a Web page via a communication network, for example, and/or a function for acquiring a Web page from a recording apparatus (not shown).

The page acquisition section 111 outputs acquired Web page information to the control section 117.

When the portable terminal 110 is a cellular phone, the page acquisition section 111 employs a communication section to perform radio communication through a base station (not shown), e.g., dials phone numbers or sends or receives email.

Under the control of the control section 117, the page storage section 112 stores pages, acquired by the page acquisition section 111, and information associated with the pages.

The timer 113 measures the current time elapsed. The date and time acquired by the timer 113 is referred to by the control section 117.

Information about an updated portion of a Web page, for example, is stored in the storage section 114 by the control section 117.

The storage section 114 includes a nonvolatile memory, such as an EEPROM, and is used to store a control program for performing speech communication or for sending or receiving emails, an Internet browser, message data, and an address book wherein names and telephone numbers are registered.

In the storage section 114, the element type extracted from Web page information, information concerning the element and the priority (priority level), and information indicating the time a Web page was browsed and the coordinates of the Web page are stored by the control section 117, in correlation with URL objects.

The operating section 115 includes a multiple ten-key number pad, and an end (speech end)/power key and a start (dialing) key when the portable terminal 110 is a cellular phone. When these keys provided for the operating section 115 are manipulated by a user, an instruction entered by the user to change a priority, or information for a position designated by the user for the display of an element on the display section 116 is output to the control section 117.

The display section 116 includes a display device, such as a liquid crystal display device (LCD), and under the control of the control section 117, displays as text received email or various types of text data that are stored in the storage section 114.

Furthermore, the display section 116, under the control of the control section 117, displays acquired Web pages in priority order and in accordance with a display style that conforms to display standards (display coordinates, the display form or/and the display size) stored in the storage section 114.

The control section 117 is constituted mainly by a micro computer, and provides control for the entire portable terminal 110. The control section 117, for example, permits the page acquisition section 111 to perform the wireless exchange of various types of information, controls the display of information on the display section 116, performs processing in response to information entered at the operating section 115, and provides access control relative to the storage section 114.

The control section 117 compares page information that is newly acquired with page information that is stored in the storage section 114, and when there is an element that is updated (changed), displays and highlights the updated element at a predetermined position. Further, when there are a plurality of updated elements, the control section 117 regards the updating of these elements as the updating of a single element, so that a change of a number (or numbers) can be regarded as not being updating. Furthermore, an element that is determined to be updated first on a predetermined Web page is regarded as an element of the highest priority.

When the number of the changed elements is greater than a predetermined count, the control section 117 does not perform an operation to display the updated elements at predetermined positions.

In addition, after the Web page information is displayed on the display section 116, the control section 117 switches the selected candidates in the order of priority levels in accordance with user instructions entered through the operating section 115, and determines the display positions of the candidates.

The control section 117 also calculates a scroll distance required to display an element at a predetermined position, and displays the element at a position, on the display section 116, separated from the initial position by the acquired scroll distance.

The control section 117 regards, as an element of the highest priority, a first element on a predetermined Web page that it is determined satisfies, the priority condition. Further, the control section 117 switches the display of a predetermined Web page to display an element of the highest priority and an element of a low priority at a predetermined position on the screen of the display section 116. In addition, the control section 117 controls the display on the display section 116, so that a state wherein the display position is moved to the next position is visually presented using animations.

When a predetermined number or more of updated portions are present on a Web page, the control section 117 assumes that the pertinent Web page is renewed and does not perform the initial scroll to display the updated portions. Further, as a display operation, an entire Web page is displayed at a reduced size, so that the position of updated portions can be indicated, and the display position is changed so that an updated portion selected by a user can be displayed at the original magnification rate. When there are no updated portions, a notice to that effect is displayed on the display section 116 using an icon or a message. When a Web page, acquired in the past, is to be compared but is not stored in the page storage section 112, a notice to that effect is displayed on the display section 116 using an icon or a message. Moreover, for a comparison of Web pages, when a link to a URL (Uniform Resource Locator), of a domain that differs from that for a Web page currently being browsed, is designated for a updated portion, the control section 117 does not detect this portion as an updated portion.

The initial Web page display operation will now be described while referring to FIG. 2.

Figure 2:
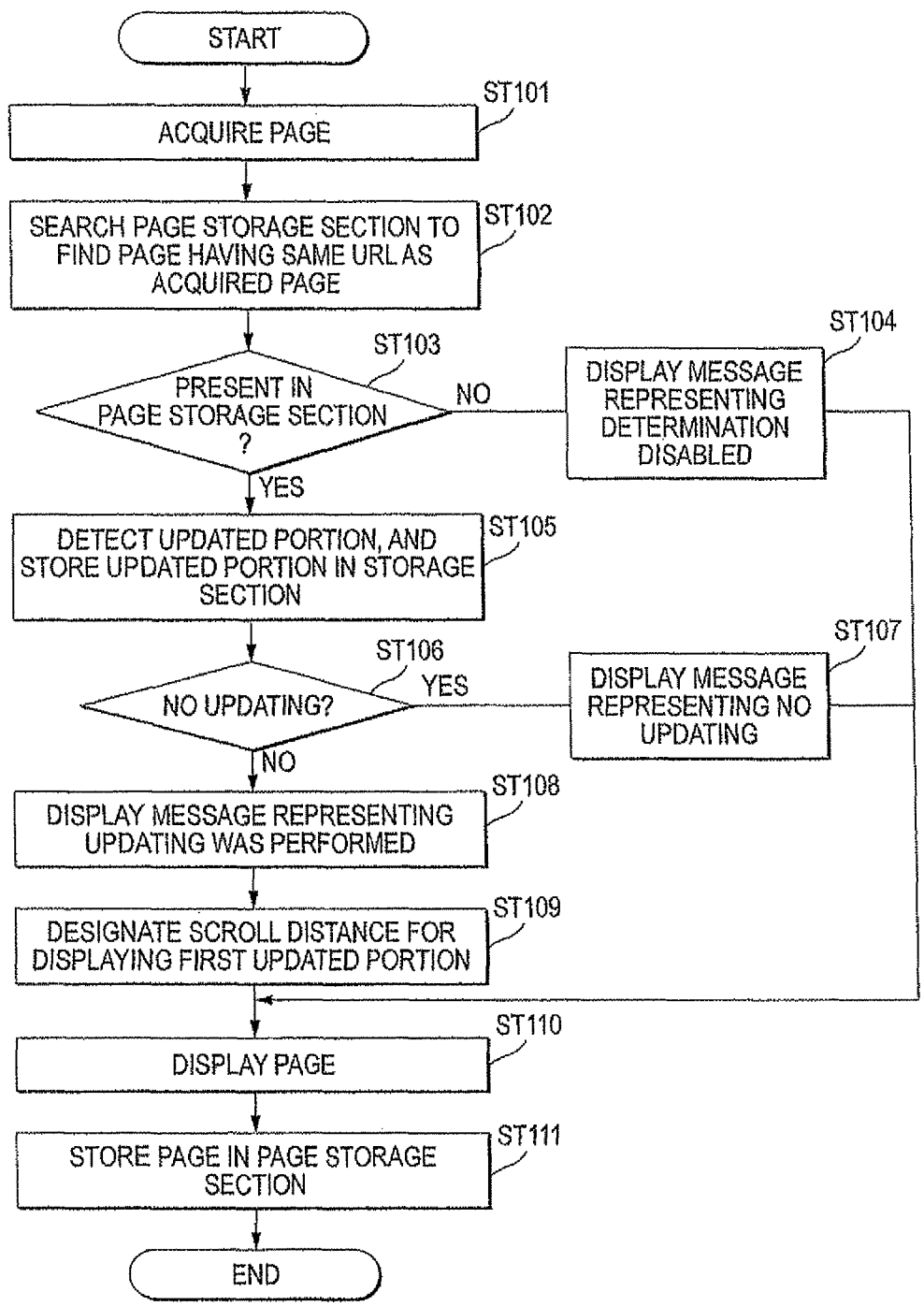
FIG. 2 is a flowchart for explaining the initial Web page display operation for the first embodiment.

FIG. 2 is a flowchart for explaining the initial Web page display operation performed by the portable terminal 110 according to the first embodiment.

First, at step ST101, a Web page to be displayed is acquired by the page acquisition section 111.

At step ST102, a Web page having the same URL as the acquired Web page is searched for among information stored in the page storage section 113.

When, at step ST103, a Web page having the same URL as the acquired Web page is not found in the page storage section 113 at step ST102, program control advances to step ST104. When such a Web page is present, program control is shifted to step ST105.

At step ST104, since a Web page, acquired in the past, that is to be compared is not present, to indicate that the process for determining whether there is an updated portion is disabled, a message or an icon is displayed on the display section 116.

At step. ST105, the control section 117 detects an updated portion, and stores information for the updated portion in the storage section 114.

At step ST106, when an updated portion is not detected during the process at step ST105, program control advances to step ST107. When an updated portion is detected, program control is shifted to step ST108.

At step ST107, a message or an icon, indicating that no updated portion is present on the acquired Web page, is displayed on the display section 116.

At step ST108, a message or an icon, indicating that an updated portion is present on the acquired Web page, is displayed on the display section 116.

At step ST109, a scroll distance is designated for the display of the first updated portion at a predetermined position (e.g., upper left, upper center, upper right, left, center, right, lower left, lower center or lower right) on the display section 116.

Following this, at step ST110, the page is displayed on the display section 116 by scrolling the screen the designated scroll distance. When the scroll distance has not designated, the scroll distance is defined as 0 both in the horizontal direction and in the vertical direction. When the scroll distance is equal to or smaller than the minimum value, or equal to or greater than the maximum value, the screen is scrolled up to the minimum distance or the maximum distance. Further, the updated portion in the Web page is displayed on the display section 116 and is highlighted.

At step ST111, the Web page acquired at step ST101 is stored in the page storage section 112, together with URL information and information concerning the date and time at which the Web page was acquired. When a Web page of this URL is already present in the page storage section 112, the stored page is overwritten.

When a new Web page can not be stored because the available memory capacity in the page storage section 112 is insufficient, data that are not registered in a bookmark and for which the access frequency is equal to or less than a predetermined level are sequentially erased, beginning with the data having the oldest storage time, until storage of the Web page in the page storage section 112 enabled.

When all the pages are registered in a bookmark, or when access frequencies for these pages are equal to or higher than the predetermined level, the erasing of data is performed beginning with data having the oldest storage time.

The operation performed upon receiving a display candidate changing request will now be described while referring to FIG. 3.

Figure 3:
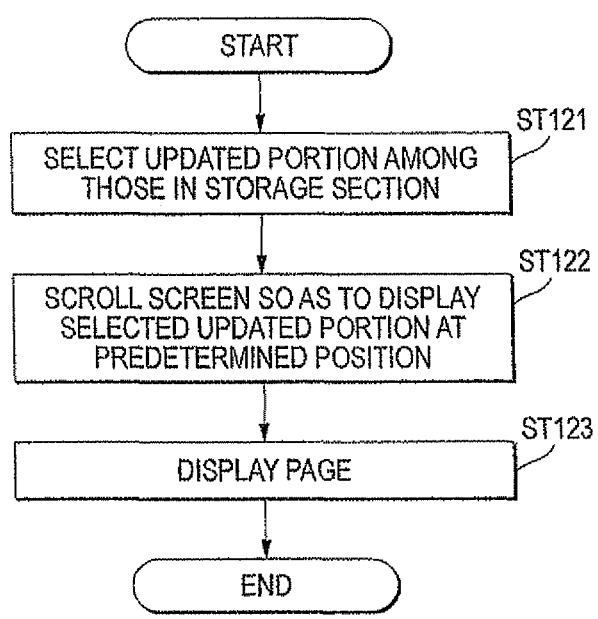
FIG. 3 is a flowchart for explaining an example operation performed upon receiving a display candidate switching request issued by a user according to the first embodiment.

FIG. 3 is a flowchart for explaining an example operation for the first embodiment performed when a display candidate changing request is issued through user manipulation of the portable terminal 110. This request is issued by the user after the initial display operation, explained while referring to FIG. 2, is performed.

At step ST121, a user selects an updated portion that was stored in the storage section 114 during the initial Web page display operation.

This process may be performed using a method whereby all updated portions are displayed on the display section 116 and a user selects one of the updated portions, or by a method whereby a user selects an updated portion either following or preceding an updated portion selected immediately before.

At step ST122, a scroll distance is calculated for displaying the selected updated portion at a predetermined position.

At step ST123, the page is displayed on the display section 116 by scrolling the screen the scroll distance acquired at step ST122.

Figure 4A:
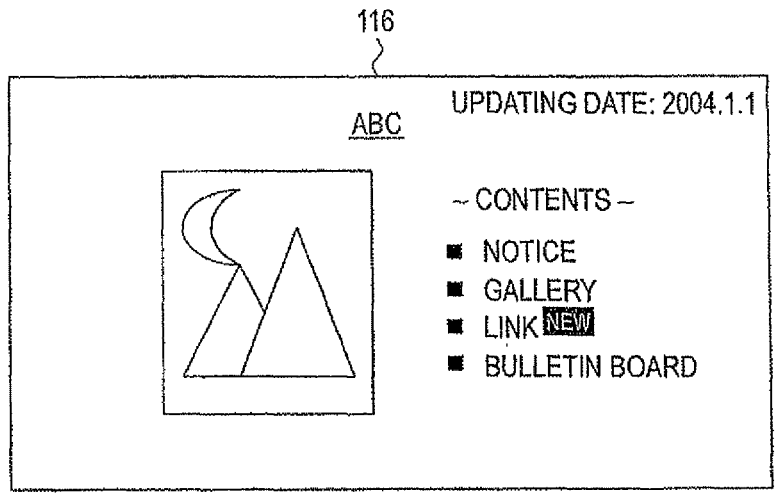
FIGS. 4A and 4B are diagrams showing the entire layouts before and after a sample Web page is updated.
Figure 4B:
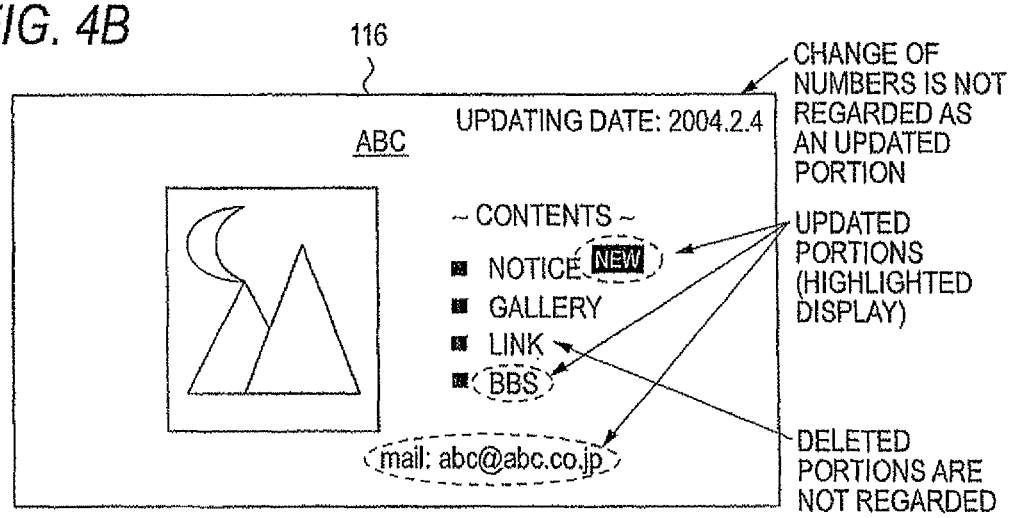

FIGS. 4A and 4B are diagrams showing entire layouts before and after a sample Web page is updated.

A Web page in FIG. 4A is the one that was previously acquired and is stored in the page storage section 112.

A Web page in FIG. 4B is the one currently acquired by the page acquisition section 111 at the same URL as in FIG. 4A.

The Web pages in FIGS. 4A and 4B are compared by the control section 117, and updated portions are detected.

According to the examples in FIGS. 4A and 4B, "NEW" is added after "notice", "NEW" after "link" is deleted, "bulletin board" is changed to "BBS", "mail:abc@abc.co.jp" is added, and an updating date is changed. It should be noted that deleted characters are not regarded as updated portions. Further, updated portions are displayed, for example, by being enclosed with a circle, so that a user can easily identify these portions.

When updated portions are present at positions near each other, these updated portions are regarded as a single updated portion.

Therefore, an increase in the number of updated portions can be suppressed, and user manipulation can be reduced.

Further, when a predetermined number or more of updated portions are present on the same page, the page is regarded as being renewed, and an initial display, of the updated portions is not presented.

In the first embodiment, when a link to a URL of a domain that differs from a Web page that is currently being browsed is designated for a updated portion, the updated portion is not regarded as a target to be detected.

The portion on a Web page that is frequently updated is usually linked to external information, such as advertisements, and such information is not very important to many users. The above described function is used to suppress updating notifications for less important information.

Furthermore, in the first embodiment, when a character string composed of numbers is updated to a character string composed of different numbers, this character string is not detected as an updated portion.

When only numbers are updated, these numbers tend to be less important information, such as access counter or page updating date information, and thus, the updating only of numbers is not detected in order to suppress an increase in the number of updated portions.

Figure 5A:
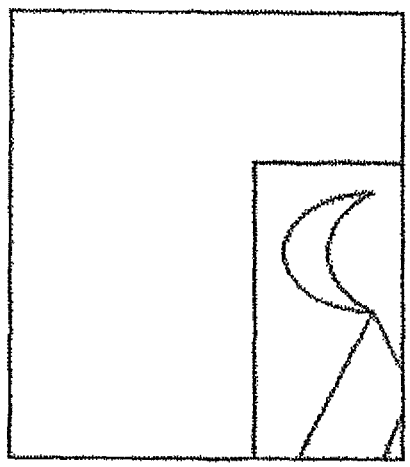
FIGS. 5A and 5B are diagrams showing a related-art display example and a display example according to the first embodiment when a Web page in FIG. 4B is browsed.
Figure 5B:
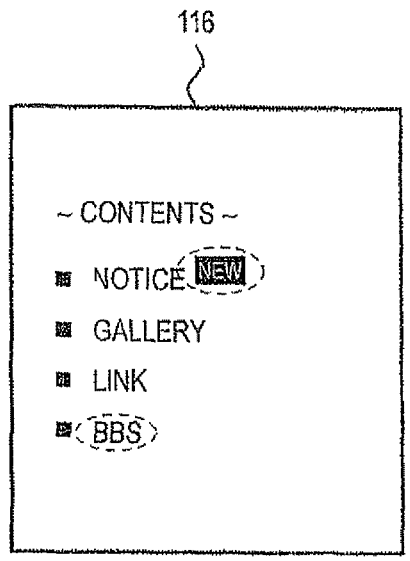

FIGS. 5A and 5B are diagrams showing a related-art display example and a display example of the first embodiment when a Web page in FIG. 4B is browsed.

The related-art display example is shown in FIG. 5A, wherein the upper left portion in FIG. 4B is displayed.

The display example for the first embodiment is shown in FIG. 5B, and the updated portion ("NEW" portion) that first appears is displayed in the center of the display section 116.

Figure 6A:
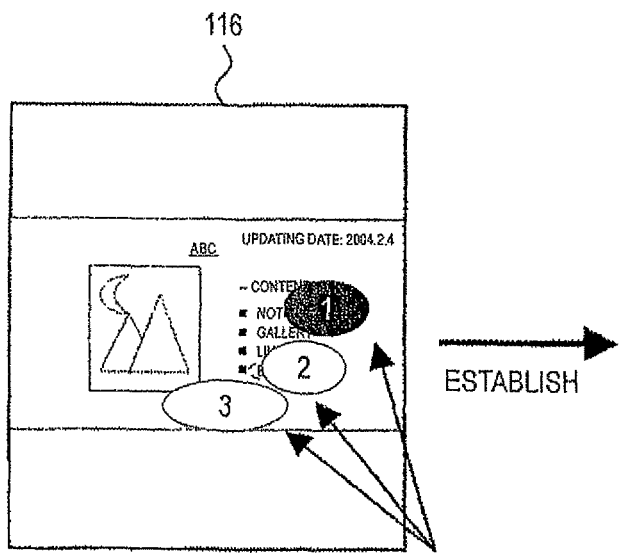
FIGS. 6A and 6B are diagrams showing an example display for a list of updated portions according to the first embodiment.
Figure 6B:
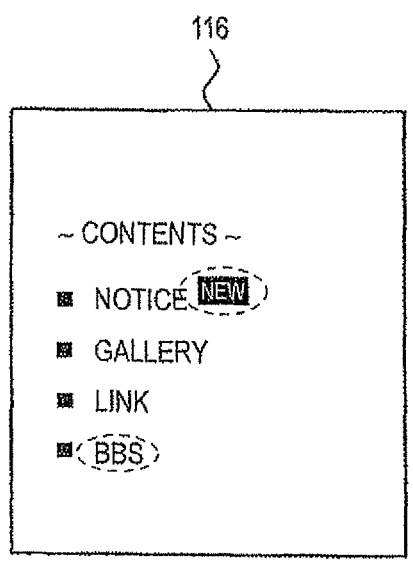

FIGS. 6A and 6B are diagrams showing a display example for a list of updated portions in the first embodiment.

When a plurality of updated portions are present on a single Web page, as shown in FIG. 6A, the positions of the updated portions are indicated by reducing the size of the entire Web page, and a user is permitted to select one of the updated portions for display.

When the user selects an updated portion for display, as shown in FIG. 6B, the screen is scrolled to display the selected updated portion at the original magnification rate.

Figure 7A:
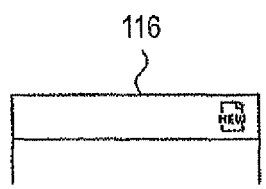
FIGS. 7A, 7B and 7C are diagrams showing an example display for the presence/absence of updating according to the first embodiment.
Figure 7B:
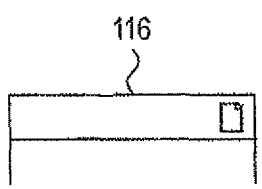
Figure 7C:
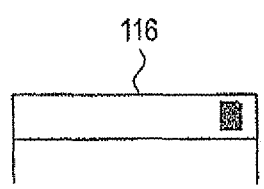

FIGS. 7A, 7B and 7C are diagrams showing a display example for the presence/absence of updating according to the first embodiment.

In this example, an icon is displayed in a pictorial area to notify the user updating is present/absent. An icon representing the presence of updating is displayed in the example in FIG. 7A, and an icon representing the absence of updating is displayed in the example in FIG. 7B. Further, in the example in FIG. 7C, an icon is displayed when the cache of a target Web page is not present in the page storage section 112 and the determination process is disabled.

Figure 8:
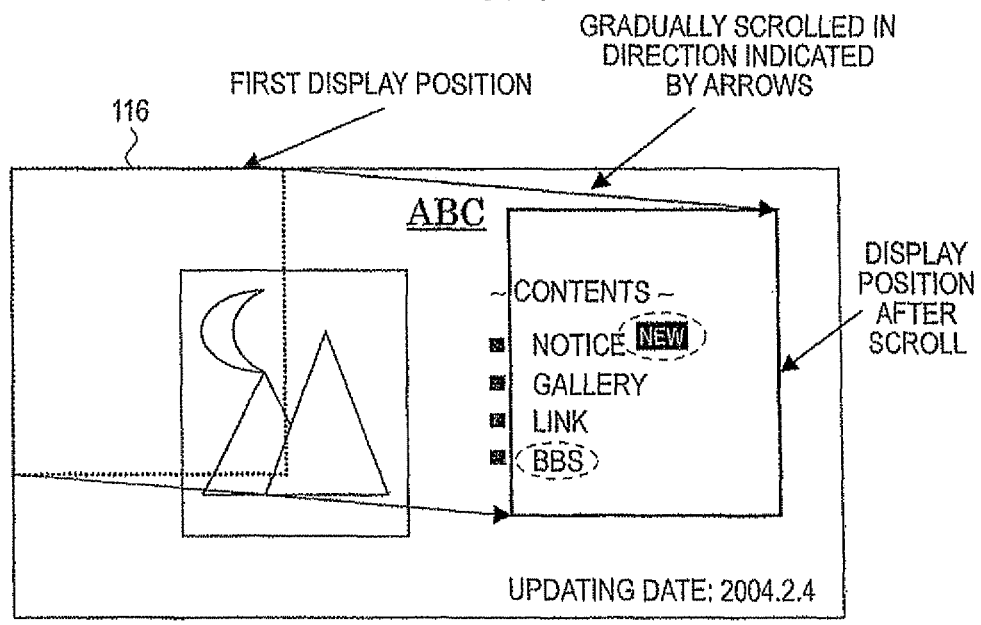
FIG. 8 is a diagram showing example shifting of a display position using animations according to the first embodiment.

FIG. 8 is a diagram showing example shifting of a display position using animations according to the first embodiment.

Since the screen is gradually scrolled from the first display position, indicated by broken lines, to a displayed position, indicated by solid lines, the user can easily identify the position, relative to a Web page, of the currently displayed screen.

Figures 9A, 9B:
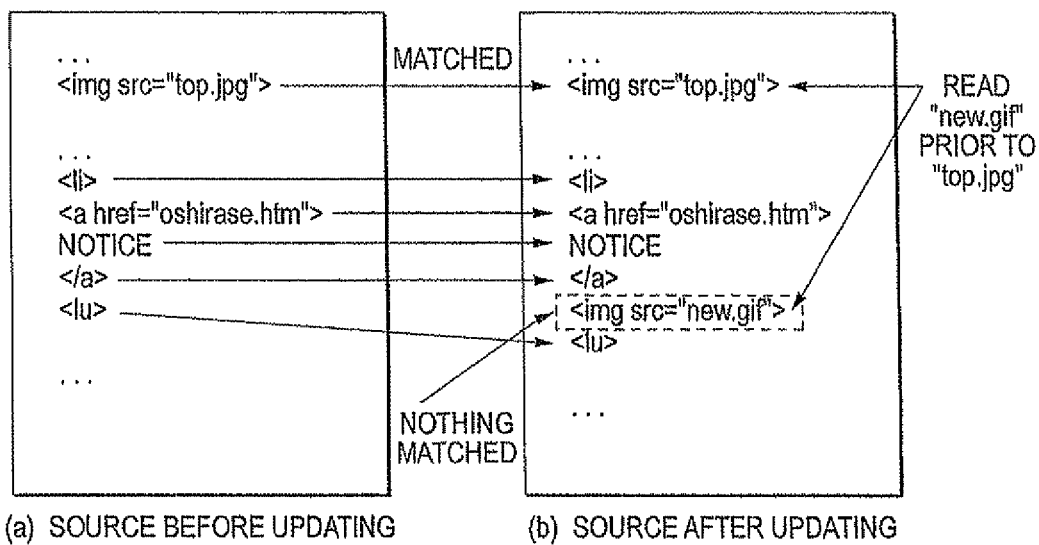
FIGS. 9A and 9B are diagrams showing an example process for detecting an updated portion according to the first embodiment.

FIGS. 9A and 9B are diagrams showing an example process for the first embodiment for detecting an updated portion.

In this case, HTML sources for Web pages in FIGS. 4A and 4B are shown in FIGS. 9A and 9B.

During a pre-process for the comparison of an updated portion in the first embodiment, comments, labels, return codes and blank codes that are not related to the display are removed from the source codes for two Web pages to be compared. Then, matching processing for the two source codes is performed to acquire corresponding elements.

Matching for normal character strings is performed for each character, but a tag is handled as a single element that can not be fragmented.

In the example in FIG. 9, through the matching process, it is found that tag <img src.="new.gif"> was added after updating was performed.

When a normal character is deleted after updating, this is not detected as an updated portion; however, when a tag is added, changed or deleted, extent of the range affected by the tag is regarded as an updated portion.

Further, as for an image, when updating dates for two image files to be compared are different, the entire image is regarded as an updated portion, even though the title of the image is not updated.

In FIGS. 9A and 9B, in the source, image "top.jpg" is designated prior to "new.gif"; however, according to the first embodiment, "new.gif", which is the updated portion, is read prior to "top.jpg", and the size information for this image is examined.

FIGS. 10A, 10B and 10C are diagrams showing the shifting of a display position.

In FIGS. 10A, 10B and 10C, the display positions of first, second and third updated portions are shown, and after a Web page is acquired, the screen is shifted to the screen in FIG. 10A, either automatically or through user manipulation.

According to the first embodiment, through either user manipulation or the use of the automatic display position switching function, the display position in FIG. 10A can be sequentially switched to the display positions in FIGS. 10B and 10C.

At this time, in order to notify the user of the presence of the next priority display candidate, a specific display is presented on the display section 116. After the last updated portion is displayed, the display position is returned to the position for the first updated portion by the switching operation.

Furthermore, when the user performs the operation for confirmation, either the highlighting for the updated portion at the current display position is switched off or the display for notifying the user of the presence of the next updated portion is deleted, and the screen is returned to the normal Web browsing screen.

As described above, according to the invention, the portable terminal 110 includes the page storage section 112, in which a Web page is temporarily stored while the Web page is being browsed. Thus, when the same Web page is browsed the next time, the control section 117 compares the Web page with the previously stored page contents and moves the display range of the page, so that the updated portion is displayed at a predetermined position on the display section 116. The following effects can be acquired.

Even with an information apparatus, such as a portable terminal, that has only a small display section, a user does not have to repeat the scroll operation to browse a Web page, and can quickly display, on the display section, a portion that includes information that the user desires to preferentially display.

Second Embodiment

Figure 11:
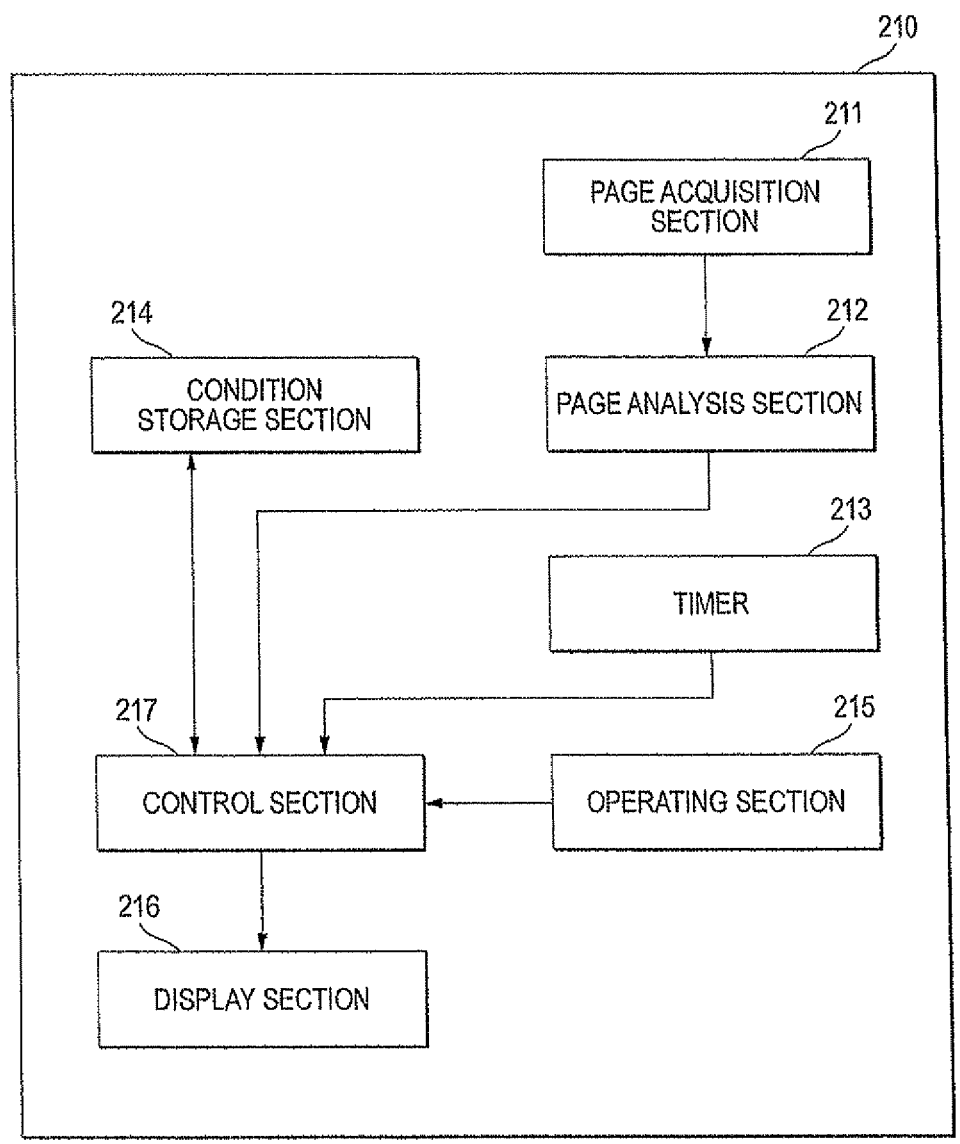
FIG. 11 is a block diagram showing a portable terminal that employs a display apparatus according to a second embodiment of the present invention.

FIG. 11 is a block diagram showing a portable terminal that employs a display apparatus according to a second embodiment of the present invention.

A portable terminal 210 for the second embodiment is an apparatus wherein browser software is mounted to enable the browsing of Web pages. Although the portable terminal 210 has only a small display section, this apparatus preferentially displays, on the display section, a portion that includes important information for a user, without the user being required to perform a scroll operation.

The portable terminal 210 can, for example, be a cellular phone or a PDA. And depicted in FIG. 11 are the functions, according to the present invention, performed by such a display apparatus when serving as an apparatus for browsing Web pages. For the second embodiment, the explanation given will mainly concern the operation of a display apparatus when serving as a browsing apparatus.

Web pages are documents that are distributed via the Internet using the WWW (World Wide Web). That is, a Web page is a set of data simultaneously displayed by a Web browser, and is composed of text data, layout information prepared using HTML, and images, sounds and moving pictures embedded in documents.

The portable terminal 210 in the second embodiment can designate, for the individual elements (multiple elements) included on each Web page, a priority level and a priority condition that includes a condition for the designation of an element. One function of the portable terminal 210 is the display, at a predetermined position, of the element of the highest priority.

Further, on the assumption that designated priority levels will be changed, depending on the Web page, i.e., that a specific element will not be present on a page, or that a specific element will have a low priority on one page but will have the highest priority on another page, the portable terminal 210 displays, at a predetermined position, an element on a predetermined page that has the highest priority of all elements that satisfy the priority condition.

In the second embodiment, the elements are character strings, images, tags, data files, controls (text boxes) included in the source of a Web page.

The information concerning an element includes an overview of the element and detailed contents.

The priority condition includes an element type, element information, a priority (priority level), a URL (Uniform Resource Locator), information about the time at which the Web page was browsed and the coordinates for the entire Web page. In the second embodiment, the coordinates can be designated by the user, and can indicate the display position when the display of the Web page ended.

Further, in the second embodiment, a function of the apparatus is the designation of the position and element is to be displayed, and with this, the center, the upper left and the upper right position on the display screen can be set as the display position.

Furthermore, the portable terminal 210 of the second embodiment includes: a function for employing address information to acquire, via a communication network, Web page information that includes multiple elements; priority information including a plurality of pairs of address designation information for designating address information and designation information for designating one element correlated with the address designation information; and a function for extracting, from the priority information, designation information correlated with address designation information designating address information of the acquired Web page information; a function for searching the acquired Web page information to find an element designated by the extracted designation information; and a function for displaying the searched element at a predetermined position.

The above described URL can be employed as address information or address designation information. The description system that represents the position of an information resource, such as a document or an image, that is present on the Internet is employed as the URL, and corresponds to the information address on the Internet. The URL is formed of an information type, a server name, a port number, and a folder name or a file name. Specifically, the URL is written as "access means://host name.domain name[:port name]/path name/file name]", and http is used as access means.

For the portable terminal 210, the priority information includes a plurality of pairs of address designation information and designation information for designating one element, and also includes priority level information that indicates a priority level for a display that is correlated with the address designation information and/or the designation information. From the priority information, a plurality of the designation information can be extracted in consonance with the address designation information for designating the address information for the acquired Web page information. When the plurality of the designation information are extracted, a searchable element of the highest priority level among a plurality of elements related with a plurality of extracted designation information is displayed at a predetermined position.

The priority level information includes a priority, a priority level, and a priority level associated with a predetermined element.

In addition, according to the second embodiment, the address designation information includes a predetermined character string. When the character string used for the address information for the acquired Web page information includes a character string preparing address designation information in the priority information, the portable terminal 210 extracts designation information correlated with the address designation information in the priority information. Then, an element designated by the extracted designation information is searched through the acquired Web page information and is displayed at a predetermined position.

That is, in the second embodiment, the priority condition is applied for the address for which the upper portion is used in common and only the lower portion is different, e.g., for a URL for which the domain name and the path name are the same.

The portable terminal 210 in the second embodiment has a function for calculating a required scroll distance for the display of an element at a predetermined position, and for the display of the element at a position separated from the initial position by the calculated scroll distance.

In the second embodiment, the portable terminal 210 also has a function for, when a browser is activated, displaying at a predetermined position an element of the highest priority. This is effected by regarding as the element of the highest priority the first element on a predetermined Web page that it is determined satisfies the priority condition.

Furthermore, in the second embodiment, the portable terminal 210 has a function for switching a display on a predetermined Web page, so that an element of the highest priority is displayed, and an element of a low priority is displayed at a predetermined position. That is, user manipulation of the portable terminal 210 is employed to sequentially change the display to elements of lower priority levels.

As described above, the portable terminal 210 has a function for switching the priority order for a display; however, either user manipulation may be employed for this display changing operation, or the operation may be performed automatically after a predetermined period of time has elapsed.

In addition, the portable terminal 210 has a function for employing animations to visually present the state for the movement from one display position to the next.

An explanation will sequentially be given for the structures and functions of the individual sections of the portable terminal 210 according to the second embodiment, the initial display operation performed for a Web page, an operation performed upon receiving a display candidate switching request, an example screen for setting a priority condition, an example screen for browsing a Web page, an example process for using animation when shifting a display position, an example process for detecting a priority condition and the processing for generating a condition table.

As shown in FIG. 11, the portable terminal 210 includes: a page acquisition section 211, a page analysis section 212, a timer 213, a storage section 214, an operating section 215, a display section 216 and a control section 217.

The page acquisition section 211 has a function for using a communication function to acquire a Web page via, for example, a communication network, and/or a function for acquiring a Web page from a recording apparatus (not shown).

The page acquisition section 211 outputs the acquired Web page information to the page analysis section 212.

When the portable terminal 210 is a cellular phone, the page acquisition section 211 employs a communication section to perform radio communication through a base station (not shown), e.g., dials phone numbers or sends or receives emails.

The page analysis section 212 analyzes a page acquired by the page acquisition section 211, acquires and extracts not only the types of elements included in the page, but also the positions of the elements on the Web page and their sizes, and outputs the results to the control section 217.

The timer 213 measures the current time elapsed. The time acquired by the timer 213 is referred to by the control section 217.

The storage section 214 stores a priority condition that, for example, is designated by user employment of the operating section 215.

The storage section 214 includes a nonvolatile memory, such as an EEPROM, and is used to store a control program for performing speech communication or for sending or receiving emails, an Internet browser, message data, and an address book wherein names and telephone numbers are registered.

In the storage section 214, the element type extracted from Web page information, information concerning the element and the priority (priority level), and information indicating the time a Web page was browsed and the coordinates of the Web page are stored by the control section 217, in correlation with URL objects.

The operating section 215 includes a multiple ten-key number pad, and an end (speech end)/power key and a start (dialing) key when the portable terminal 210 is a cellular phone. When these keys provided for the operating section 215 are manipulated by a user, an instruction entered by the user to change a priority condition or a priority, or information for a position designated by the user for the display of an element on the display section 216 is output to the control section 217.

The display section 216 includes a display device, such as a liquid crystal display device (LCD), and under the control of the control section 217, displays as text received email or various types of text data that are stored in the storage section 214.

Furthermore, the display section 216, under the control of the control section 217, displays acquired Web pages in priority order and in accordance with a display style that conforms to display standards (display coordinates, the display form or/and the display size) stored in the storage section 214.

The control section 217 is constituted mainly by a microcomputer, and provides control for the entire portable terminal 210. The control section 217, for example, permits the page acquisition section 211 to perform the wireless exchange of various types of information, controls the display of information on the display section 216, performs processing in response to information entered at the operating section 215, and provides access control relative to the storage section 214.

The control section 217 compares the priority conditions stored in the storage section 214 with information acquired for the Web page extracted by the page analysis section 212 and the time information acquired by the timer 213, and determines which portions match the conditions for designation as a priority display candidate. Furthermore, the control section 217 always adds condition "coordinates (0, 0)" as a candidate of the lowest priority.

When there are a plurality of candidates that match a specific condition, the control section 217 allocates a higher priority to the candidate that was first detected.

At the initial display time, the control section 217 selects the candidate of the highest priority, and determines the display position for this candidate on the display section 216.

Further, after Web page information is displayed on the display section 216, the control section 217 changes the priority order of selected candidates as the user manipulates the operating section 215, and determines the display positions for these candidates.

The control section 217 calculates a scroll distance required to display an element at a predetermined position, and displays the pertinent element on the display section 216 at a position separate from the initial position at the scroll distance that is acquired by the calculation.

In addition, the control section 217 has a function whereby, when the browser is activated, the element of the highest priority is displayed at a predetermined position. Further, the first element on a predetermined Web page that is determined to satisfy the priority condition is regarded as the element of the highest priority.

Moreover, the control section 217 changes the display, so that, on a predetermined Web page, the element of the highest priority is displayed and an element of a low priority is displayed at a predetermined position on the screen of the display section.

Furthermore, the control section 217 controls the display on the display section 216 using animations, so that the shifting from one display position to the next can be visually presented.

The initial operation for displaying a Web page will now be explained while referring to FIG. 12.

Figure 12:
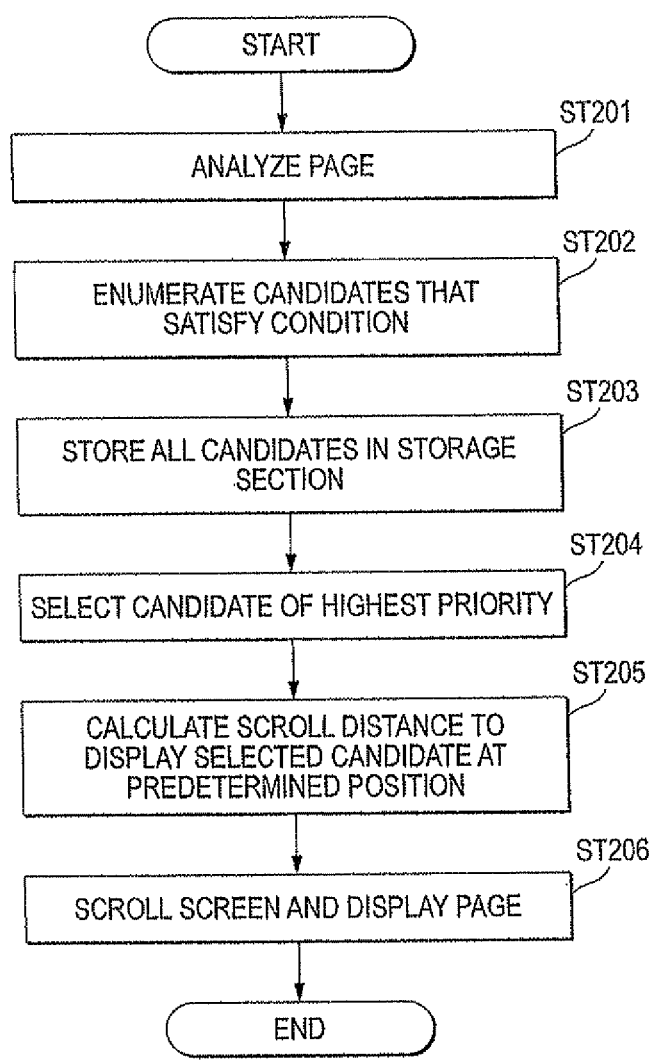
FIG. 12 is a flowchart for explaining the initial Web page display operation for the second embodiment.

FIG. 12 is a flowchart for explaining the initial Web page display operation performed by the portable terminal 210 according to the second embodiment.

First, at step ST201, for a Web page that is acquired and displayed by the page acquisition section 211, the page analysis section 212 analyzes and extracts elements, such as character strings, images and controls that are present on the page and information for these elements (e.g., positions, sizes, presence/absence of links and font information). The analysis results are transmitted to the control section 217.

Then, at step ST202, the control section 217 compares the page analysis results acquired by the page analysis section 212 with a priority condition stored in the storage section 214, and enumerates, as display candidates, elements that satisfy the condition.

At step ST203, the control section 217 registers all of the candidates in the storage section 214 in order to change the display candidates after they are displayed once. Through this process, when the candidates are to be changed, the process performed for the comparison with the condition need not be repeated. It should be noted that the contents registered in the storage section 214 are erased when a Web page to be displayed is changed.

At step ST204, from among the enumerated candidates, the control section 217 selects the candidate of the highest priority.

At step ST205, the control section 217 calculates a scroll distance for displaying the selected candidate at a predetermined position (e.g., upper left, upper center, upper right, left, center, right, lower left, lower center or lower right) on the display section 16.

Since the position and the size of the element are already known through the analysis performed at step ST1, the appropriate scroll distance is acquired based on information concerning the width and the height of the display section 216.

At step ST206, the control section 217 scrolls the screen the scroll distance acquired at step ST205, and displays the selected candidate on the display section 216. When the scroll distance is equal to or smaller than a predetermined minimum value, or equal to or greater than a predetermined maximum value, the screen is scrolled to the minimum limited distance or the maximum limited distance.

The operation performed upon receiving a display candidate change request will now be described while referring to FIG. 13.

Figure 13:
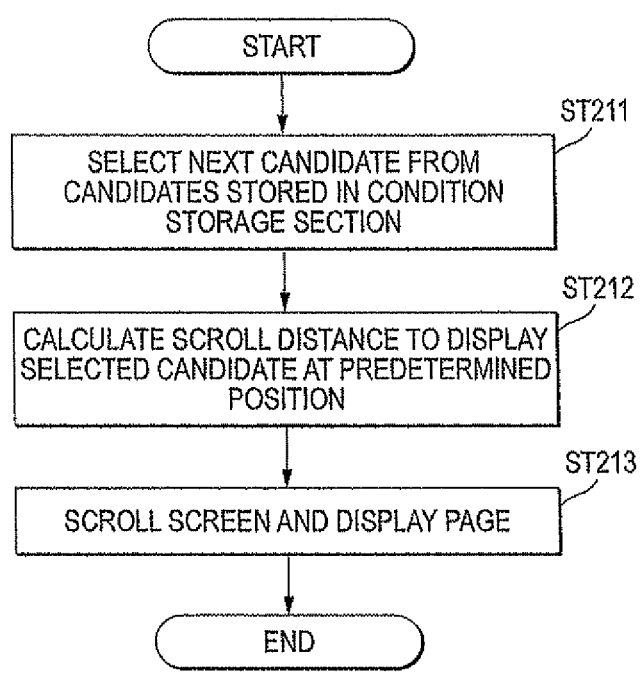
FIG. 13 is a flowchart for explaining an example operation performed in the second embodiment when a display candidate switching request is issued by a user.

FIG. 13 is a flowchart for explaining an example operation for the second embodiment performed when a display candidate change request is issued in response to user manipulation of the portable terminal 210. This request is issued by the user after the initial display operation, explained while referring to FIG. 12, is performed.

At step ST211, a user is permitted to select one of the display candidates that were registered in the storage section 214 when the Web page was initially displayed. This process may be performed using a method whereby all the candidates are displayed on the display section 216 and the user is permitted to select one of them, or a method whereby the user is permitted to select either a candidate of a priority that is higher by one level than the candidate that was selected immediately before or a candidate of a priority that is lower by one level.

At step ST212, as at step ST205 in FIG. 12, the control section 217 calculates a scroll distance for displaying the selected candidate at a predetermined position.

At step ST213, as at step ST206 in FIG. 12, the control section 217 scrolls the screen the scroll distance acquired at step ST212.

While referring to FIGS. 14A to 14D, an explanation will now be given for an example process for setting a priority condition in accordance with a display screen.

FIGS. 14A to 14D are diagrams showing example screens, displayed on the display section 216, on which the control section 217 of the second embodiment permits a user to designate a priority condition (a display condition) that it stores in the storage section 214.

For setting a priority condition, as shown in FIG. 14A, a user manipulates the operating section 215 to enter the URL for which a condition to be designated is to be applied. When a Web page was displayed immediately before, this URL is included as the initial value for this entry.

Further, in the second embodiment, a choice can be made to apply a condition to all the URLs, instead of designating a specific URL, and a choice can be made to manually enter a URL. Furthermore, from among such elements as a character string, an image/moving picture, a control (e.g., a push button, a radio button, a check button or a text box) and coordinates, an object that is to be preferentially displayed can be designated as a condition by manipulating the operating section 215. In addition, the display position of this selected element on the display section 216 is designated by manipulating the operating section 215. The time zone during which this condition is applied is also designated.

When a "character string" is designated as a condition in FIG. 14A, an example screen in FIG. 14B is displayed for the setting of a detailed condition.

In the example in FIG. 14B, a character string including "topics" is regarded as a priority display condition. On this screen, a condition can be designated based on the character string, the style (including the font, the size and the color) of the character string and the presence/absence of a link.

An example screen in FIG. 14C is displayed for setting the priority of the designated condition.

In the example in FIG. 14C, two conventional conditions are present, and a middle level priority between the two conventional conditions is selected as a priority level for the designated condition.

A screen in FIG. 14D is displayed after the second priority is allocated for the condition on the screen in FIG. 14C. The currently designated condition is inserted into the second priority and the previous second condition is moved to the third priority.

When the process sequences shown in FIGS. 14A to 14D are ended, the priority display condition thus designated is registered in the priority condition storage section, and during the display position determination operation performed by the control section 217, the candidate detector of the control section 217 refers to the priority display condition.

While referring to FIGS. 15A to 15F, an explanation will now be given for the operation for setting a display condition based on a Web page that is currently being displayed.

FIGS. 15A to 15F are diagrams showing example screens displayed on the display section 216, on which the control section 217 of the second embodiment permits a user to designate a priority condition (a display condition), based on a Web page that is currently being displayed, that it stores in the storage section 214.

Figure 15A:
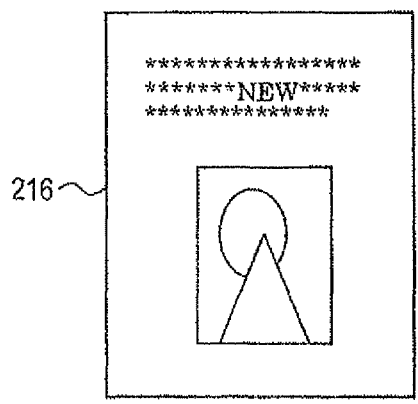
FIGS. 15A to 15F are diagrams showing example screens, displayed on a display section, on which the control section of the second embodiment permits a user to designate, based on a currently displayed Web page, a priority condition (a display condition) that the control section stores.

In the example screen in FIG. 15A, a Web page is being browsed. The example screen in FIG. 15B is displayed when a condition setup menu is called by the user while the Web page is being browsed.

On this screen, the user manipulates the operating section 215 to select an element that is designated as a priority condition.

Figure 15B:
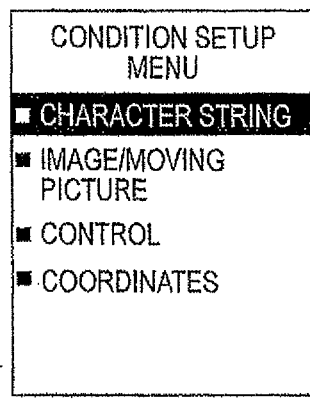
Figure 15C:
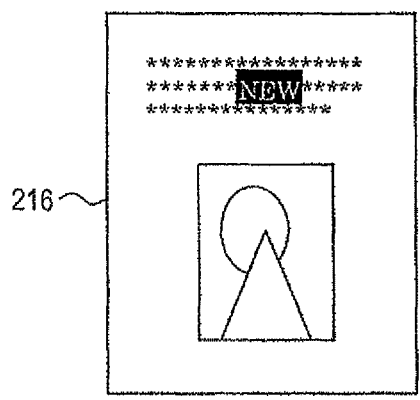

On the screen in FIG. 15C, the element ("character string" in this case) selected in FIG. 15B is also selected on the Web page that is currently being displayed. When "coordinates" is selected in FIG. 15B, however, the screen in FIG. 15C is omitted, and the coordinate location for the upper left point is indicated on the screen that is currently displayed.

Figure 15D:
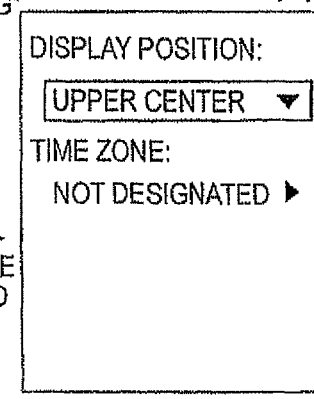

The example screen in FIG. 15D is used to designate the display position on the screen, and a condition, such as a browsing time zone condition.

Figure 15E:
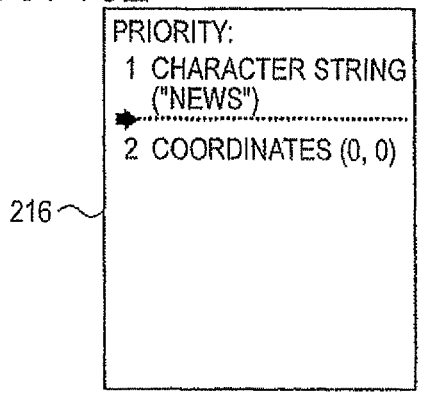
Figure 15F:
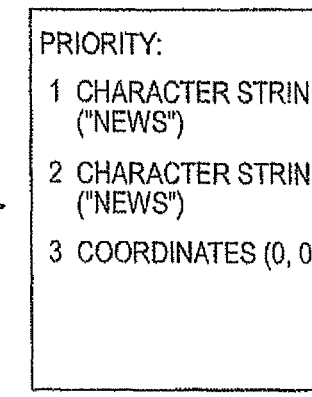

On the screen in FIG. 15E, the priority level is set for a designated condition. On the screen in FIG. 15F, the priority is displayed of a condition for which the priority is allocated.

The condition thus registered is stored in the storage section 214 in correlation with the URL, and becomes effective only when a page including the URL is displayed.

It should be noted that after the registration, the editing of the conventional condition, using the method shown in FIGS. 14A to 14D, is also enabled.

An explanation will be given for a normal display screen and for a display screen provided by the display section 216 in the second embodiment when a Web page is browsed.

Figure 16:
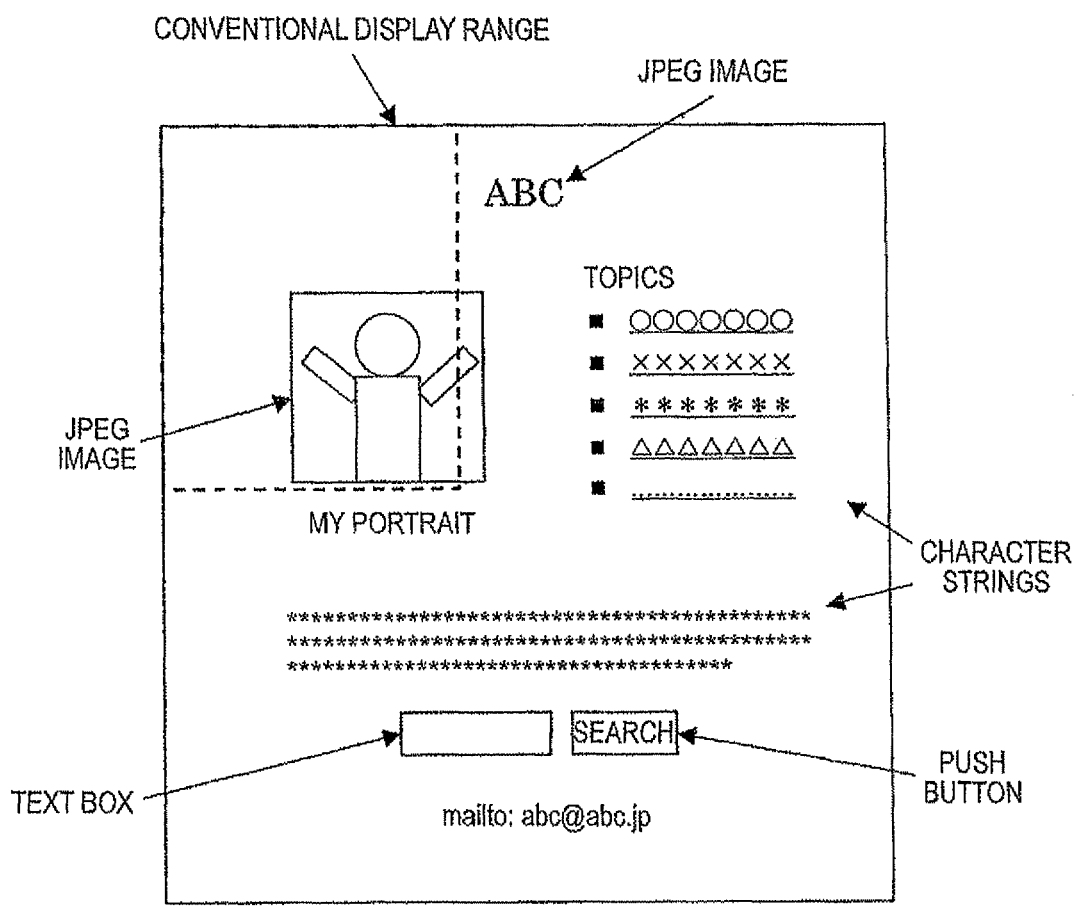
FIG. 16 is a diagram showing the layout of the entire Web page, and an example normal display screen.

FIG. 16 is a diagram showing the layout for an entire Web page and an example, normal display screen.

FIGS. 17A to 17D are diagrams showing example display screens provided by the display section 216 of the second embodiment when a Web page is browsed.

In FIG. 16, a block indicated by a broken line represents the initial display range of the general (normal) display method that does not perform enlargement or reduction of the size of an image.

According to the normal display method, the upper left portion is displayed first; however, in many cases, the upper left portion is blank, and a user is required to perform a scroll operation.

Figure 17A:
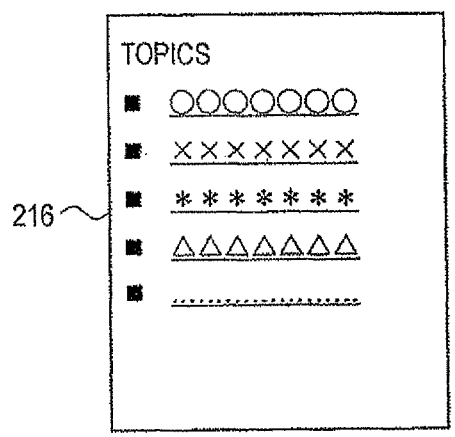
FIGS. 17A to 17D are diagrams showing example screens displayed on the display section of the second embodiment when the Web page is browsed.

In FIG. 17A, a candidate that matches priority display condition "character string of 'topics'" is preferentially displayed on the screen.

Since the upper left display position is designated, the screen is scrolled so as to display the character string of "topics" at the upper left position.

Figure 17B:
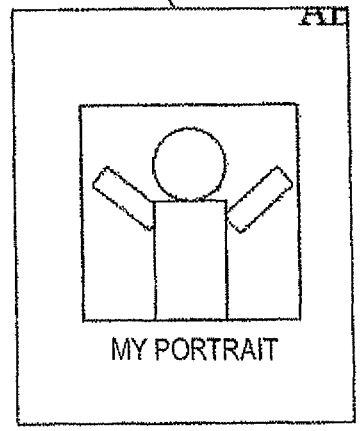

In the example in FIG. 17B, a candidate that matches display condition "image" is displayed in the center on the screen.

When "image" is designated as a condition, the control section 217 actually searches for tag <img . . . >, which is included in an HTML file wherein a Web page is written, and determines whether the file name designated in the tag matches the condition. When the file name matches the condition, the screen is scrolled, so that image data can be read while displayed at a predetermined position.

Figure 17C:
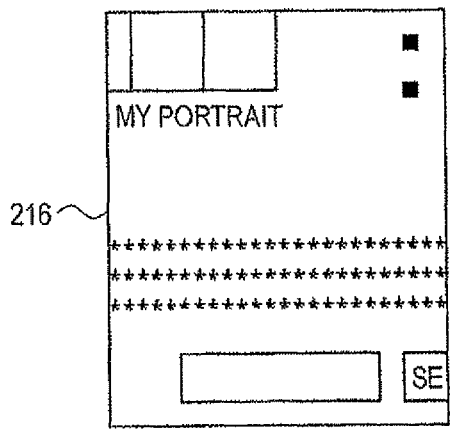

In the example in FIG. 17C, a candidate that matches display condition "control (text box)" is displayed in the lower center of the screen.

When "control" is designated as a condition, the control section 217 also searches for tag <input . . . > in an HTML file, and determines whether the type of control included in the tag matches the condition.

Figure 17D:
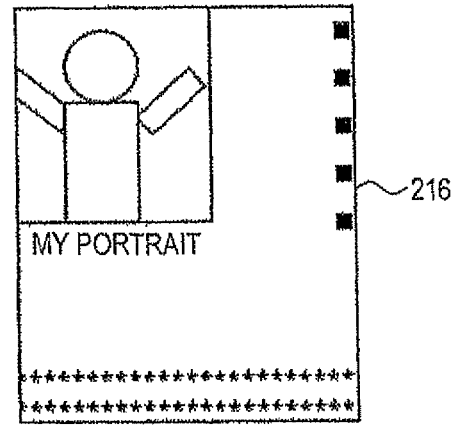

In the example in FIG. 17D, a candidate that matches display condition "coordinates (100, 100)" is displayed at the upper left position on the screen.

The process for moving a display position using animations will now be described while referring to FIG. 18.

Figure 18:
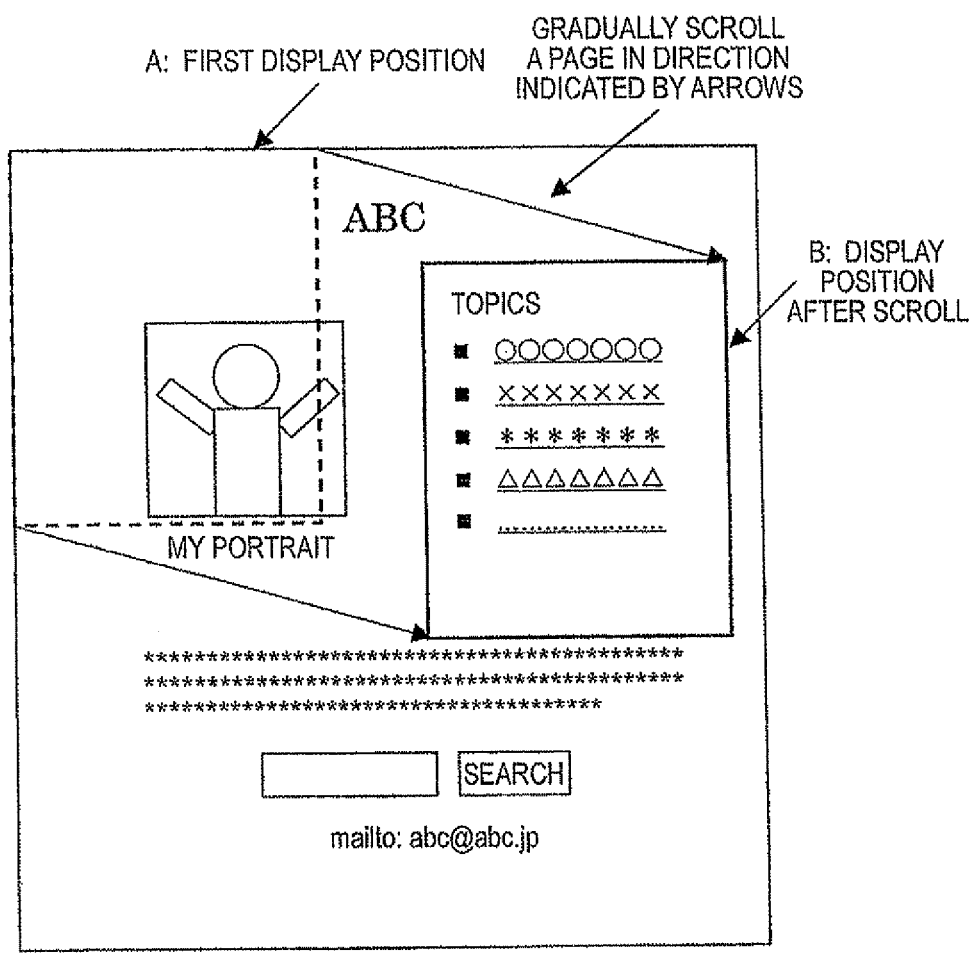
FIG. 18 is a diagram showing example shifting of a display position using animations according to the second embodiment.

FIG. 18 is a diagram showing an example process, according to the second embodiment, for shifting a display position using animations.

Since the screen is gradually scrolled from an initial display position A, indicated by a broken line in FIG. 18, to a display position B, indicated by a solid line in FIG. 18, the position of the currently displayed screen, relative to the Web page, can be easily identified by a user.

An example process for detecting a priority condition will now be explained while referring to FIGS. 19A to 19C.

FIGS. 19A to 19C are diagrams for explaining the example process, according to the second embodiment, for detecting a priority condition.

Assume that, as shown in FIG. 19A, the HTML source code for a Web page is displayed.

The screen in FIG. 19B is displayed when an image having the file name "mypic.jpg", displayed in the center of the screen, is designated in the HTML source code in FIG. 19A, image "ABC.jpg" is designated prior to image "mypic.jpg"; however, in the second embodiment, image "mypic.jpg", which matches the condition, is read prior to "ABC.jpg", and size information for this image is examined.

The screen in FIG. 19C is displayed when the display of a text box in the lower center of the screen designated.

The "input" tag in the source code is searched for, and based on the type of information included in the tag, the type of text box or push button is determined.

The processing for generating a condition table will now be described while referring to FIGS. 20A, 20B, 21A and 21B.

FIGS. 20A, 20B, 21A and 21B are diagrams for explaining the condition table generation processing according to the second embodiment.

This processing is regarded as an example generation processing performed when in FIG. 16, the Web page at the URL http://www.aaa.jp was browsed at 18:00.

A table in FIG. 20A shows all the conditions registered in the storage section 214 by the control section 217.

This table includes, as columns, "priority", "URL", "time zone", "element (condition)", "condition data" and "(display) position".

For example, for the first priority, URL "www.aaa.jp", time zone "none", element "image", condition data "file name mypic.jpg" and display position "center" are registered.

For the second priority, URL "none", time zone "12:00 to 19:00", element "character string", condition data "news" and display position "upper left" are registered.

For the third priority, URL "none", time zone "none", element "character string", condition data "topics" and display position "upper left" are registered.

For the fourth priority, URL "none", time zone "none", element "character string", condition data "today's fortune" and display position "upper left" are registered.

For the fifth priority, URL "www.aaa.jp", time zone "5:00 to 9:00", element "control", condition data "push button" and display position "lower right" are registered.

For the sixth priority, URL "www.bbb.co.jp", time zone "none", element "control", condition data "photograph" and display position "upper center" are registered.

For the seventh priority, URL "none", time zone "20:00 to 23:00", element "image", condition data "extension 'gif'" and display position "center" are registered.

For the eighth priority, URL "www.aaa.jp", time zone "17:00 to 20:00", element "control", condition data "text box" and display position "lower center" are registered.

For the ninth priority, URL "www.ccc.ne.jp", time zone "none", element "control", condition data "text box" and display position "left" are registered.

For the tenth priority, URL "none", time zone "none", element "coordinates", condition data "0, 0" and display position "upper left" are registered.

A table in FIG. 20B is a table generated by filtering the entries in the table in FIG. 20A in accordance with the condition and the condition data. When the entries are sorted, the following results are acquired.

For the first priority, URL "www.aaa.jp", time zone "none", element "image", condition data "file name mypic.jpg" and display position "center" are registered.

For the second priority, URL "none", time zone "none", element "character string", condition data "topics" and display position "upper left" are registered.

For the third priority, URL "www.aaa.jp", time zone "5:00 to 9:00", element "control", condition data "push button" and display position "lower right" are registered.

For the fourth priority, URL "www.bbb.co.jp", time zone "none", element "character string", condition data "photograph" and display position "upper center" are registered.

For the fifth priority, URL "www.aaa.jp", time zone "17:00 to 20:00", element "control", condition data "text box" and display position "lower center" are registered.

For the sixth priority, URL "www.ccc.ne.jp", time zone "none", element "control", condition data "text box" and display position "left" are registered.

For the seventh priority, URL "none", time zone "none", element "coordinates", condition data "0, 0" and display position "upper left" are registered.

A table in FIG. 21A is a table generated by removing a condition according to which a URL is designated that does not match a URL for a Web page to be displayed in FIG. 20B, and by then sorting the entries so that the priority of the condition according to which the URL is designated is given higher than the priority of a condition according to which the URL is not designated. That is, the table in FIG. 21A is acquired by filtering the entries in FIG. 21B based on the URL, and sorting the entries. For example, a case is shown wherein for the browsing of "www.ccc.ne.jp". As a result of sorting the entries, the following is acquired.

For the first priority, URL "www.aaa.jp", time zone "none", element "image", condition data "file name mypic.jpg" and display position "center" are registered.

For the second priority, URL "www.aaa.jp", time zone "5:00 to 9:00", element "control", condition data "push button" and display position "lower right" are registered.

For the third priority, URL "www.aaa.jp", time zone "17:00 to 20:00", element "control", condition data "text box" and display position "lower center" are registered.

For the fourth priority, URL "none", time zone "none", element "character string", condition data "topics" and display position "upper left" are registered.

For the fifth priority, URL "none", time zone "none", element "coordinates", condition data "0, 0" and display position "upper left" are registered.

A table in FIG. 21B is a table generated by removing a condition for which a time zone that does not match a browsing time is designated in FIG. 21A, and by then sorting the entries so that the priority of a condition according to which a time zone is designated is given higher than the priority of a condition according to which a time zone is not designated. The thus generated table is registered in the storage section 214 as a table wherein the final priority display positions are entered.

The contents of the table finally registered are as follows.

For the first priority, URL "www.aaa.jp", time zone "17:00 to 20:00", element "control", condition data "text box" and display position "lower center" are registered.

For the second priority, URL "www.aaa.jp", time zone "none", element "image", condition data "file name mypic.jpg" and display position "center" are registered.

For the third priority, URL "none", time zone "none", element "character string", condition data "topics" and display position "upper left" are registered.

For the fourth priority, URL "none", time zone "none", element "coordinates", condition data "0, 0" and display position "upper left" are registered.

Figure 22A:
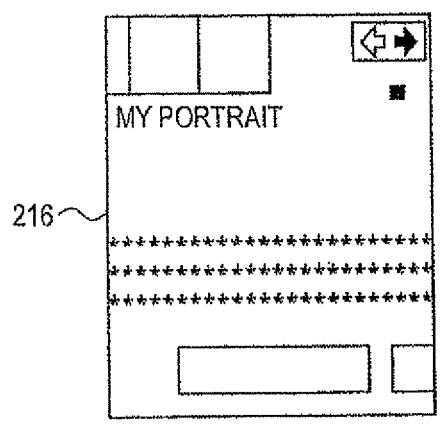
FIGS. 22A to 22D are diagrams showing the shifting of a display position in accordance with the final table acquired through the process shown in FIGS. 20A, 20B, 21A and 21B.
Figure 22B:
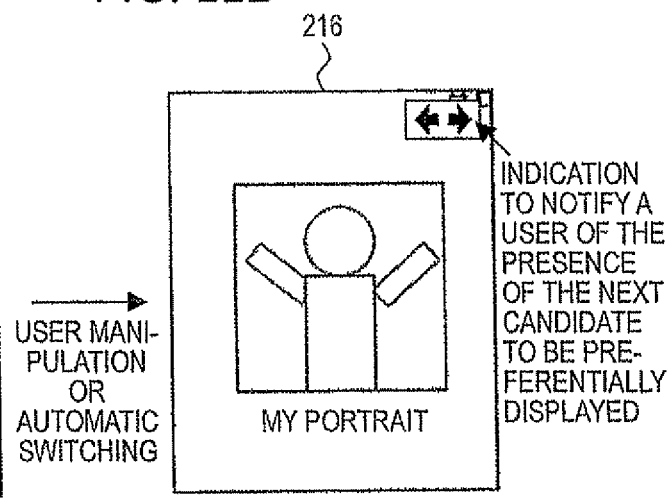

FIGS. 22A and 22B are diagrams showing the shifting of a display position in accordance with the final tables acquired in FIGS. 201, 20B, 21A and 21B.

The display position for the first priority is shown in FIG. 221, and is regarded as the initial display position for the current Web page. The display positions shown in FIGS. 22B, 22C and 22D are those for the second priority, the third priority and the fourth priority.

Figure 22C:
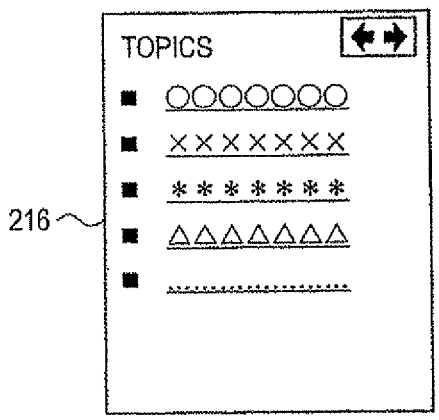
Figure 22D:
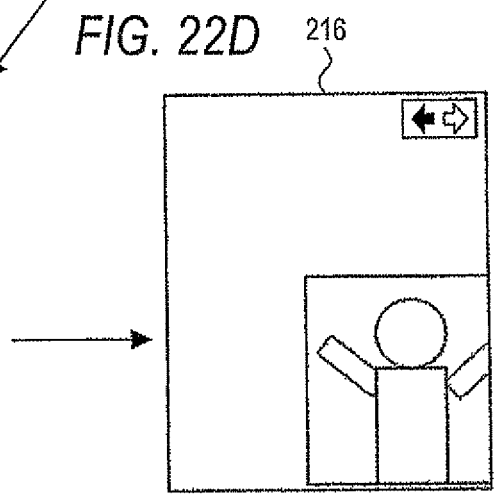

In the second embodiment, user manipulation or the automatic display position switching function can also be employed to sequentially shift the display position shown in FIG. 22A to the display positions shown in FIGS. 22B, 22C and 22D.

At this time, in order to notify the user of the presence of the next candidate to be preferentially displayed, a specific presentation is provided on the display section 216. After the candidate of the lowest priority is displayed, the display position is returned to the display position for the first priority by the switching function.

As described above, according to the invention, priorities are provided for conditions for display positions (e.g., positions whereat a character string, an image, a text box and a button or a coordinate point are included) on a Web page and are stored in the storage section 214. Then, when the Web page is displayed on the display section 216, the control section 217 detects a portion that matches the stored condition and that has a high priority. Thereafter, the control section 217 moves the display range, so that the detected portion can be displayed at a predetermined position on the display section 216. As a result, the following effects can be acquired.

Even with an information apparatus, such as a portable terminal, that has only a small display section, a user need not repeat the scroll operation to browse a Web page, and can quickly display, on the display section, a portion that includes information that the user desires to preferentially display.

What is claimed is:

1. A display apparatus, comprising:
    an acquisition section which acquires Web page information including a plurality of elements;
    a storage section which stores at least a part of Web page information acquired by the acquisition section;
    a display section which displays Web page information acquired by the acquisition section; and
    a control section which compares new Web page information acquired by the acquisition section with Web page information previously acquired from an address identical with that of the new Web page information and stored in the storage section, and which controls to display a changed element in the new Web page information at a predetermined position on the display section,
    wherein the control section controls to display the changed element at the predetermined position, in accordance with priorities designated based on a type of change, and
    wherein the changed element is changed content of the Web page information.

2. The display apparatus according to claim 1,
    wherein when there is a plurality of the changed elements, the control section treats the plurality of the changed elements as a single change of element.

3. The display apparatus according to claim 1,
wherein the control section treats a change of numbers as no change.

4. The display apparatus according to claim 1,
wherein when the number of the changed elements is greater than a predetermined count, the control section controls not to display the changed elements at predetermined position.

5. The display apparatus according to claim 1, further comprising:
a designation section which designates a position for displaying the changed element.

6. The display apparatus according to claim 1,
wherein the control section calculates a scroll distance to display the changed element at the predetermined position, and controls to display the changed element at a position separated from an initial position by the calculated scroll distance.

7. The display apparatus according to claim 1,
wherein when predetermined Web page information is acquired, the control section compares the predetermined Web page information with Web page information previously acquired from an address identical with that of the predetermined Web page information and stored in the storage section.

8. The display apparatus according to claim 1, further comprising:
a switching section which switches a display of predetermined Web page information to display an element of the highest priority and an element of a low priority at the predetermined position.

9. The display apparatus according to claim 1,
wherein the control section controls to preferentially display an element in predetermined Web page information that is determined to be changed first at a predetermined position.

10. The display apparatus according to claim 1,
wherein the control section does not treat a changed element as to be detected when a link to another Web page is set in the changed element in a displayed Web page.

11. A display apparatus, comprising:
an acquisition section which acquires Web page information including a plurality of elements; and
a display section which displays Web page information acquired by the acquisition section,
wherein the display section displays a predetermined element designated for each Web page information at a predetermined position, in accordance with priorities, and
wherein, when a browser is started, the display section displays an element of the highest priority at the predetermined position.

12. A display apparatus, comprising:
an acquisition section which acquires Web page information including a plurality of elements;
a storage section which stores priority information including a plurality of pairs of address designation information for designating address information and designation information for designating one element correlated with the address designation information;
an extraction section which extracts, from the priority information, designation information correlated with address designation information designating address information of the Web page information acquired by the acquisition section;
a search section which searches through the Web page information acquired by the acquisition section to find an element designated by the designation information extracted by the extraction section; and
a display section which displays the element searched by the searching section at a predetermined position,
wherein, when a browser is started, the display section displays an element of the highest priority at the predetermined position.

13. The display apparatus according to claim 11, further comprising:
a calculation section which calculates a scroll distance to display the searched element at a predetermined position,
wherein the display section displays the searched element at a position separated from an initial position by the calculated scroll distance.

14. The display apparatus according to claim 11, further comprising:
a switching section which switches a display of predetermined Web page information to display an element of the highest priority and an element of a low priority at the predetermined position.

15. The display apparatus according to claim 11,
wherein the display section preferentially displays an element in predetermined Web page information that is determined to be changed first as an element of the highest priority.

16. The display apparatus according to claim 12,
wherein the priority information includes priority level information indicating a display priority correlated with the address designation information and/or the designation information,
the extraction section extracts, from the priority information, a plurality of designation information correlated with the address designation information for designating address information of the Web page information acquired by the acquisition section,
the search section searches through the Web page information acquired by the acquisition section to find a plurality of elements correlated with each of the plurality of the designation information extracted by extraction section, and
the display section displays an element of the highest priority among the elements searched by the search section at the predetermined position.

17. The display apparatus according to claim 12,
wherein the priority information includes position information indicating a predetermined position that corresponds to the address designation information and/or the designation information, and
the display section displays the element extracted by the extraction section at a predetermined position represented by the position information.

18. The display apparatus according to claim 12, further comprising:
a section which sets the priority information.

19. The display apparatus according to claim 12,
wherein the address designation information includes a predetermined character string,
when a character string constituting address information for the acquired Web page information includes a character string preparing address designation information in the priority information, the extraction section extracts designation information correlated with the address designation information in the priority information, the searching section searches the acquired Web page information to find an element designated by the extracted designation information, and the display section displays the searched element at a predetermined position.

20. The display apparatus according to claim 12, further comprising:
a calculation section which calculates a scroll distance to display the searched element at a predetermined position,
wherein the display section displays the searched element at a position separated from an initial position by the calculated scroll distance.

21. The display apparatus according to claim 12, further comprising:
a switching section which switches a display of predetermined Web page information to display an element of the highest priority and an element of a low priority at the predetermined position.

22. The display apparatus according to claim 12,
wherein the display section preferentially displays an element in predetermined Web page information that is determined to be changed first as an element of the highest priority.

23. A display apparatus, comprising:

an acquisition section which acquires Web page information including a plurality of elements;

a storage section which stores at least a part of Web page information acquired by the acquisition section;

a display section which displays Web page information acquired by the acquisition section; and a control section which compares new Web page information acquired by the acquisition section with Web page information previously acquired from an address identical with that of the new Web page information and stored in the storage section, and which controls to display a changed element in the new Web page information at a predetermined position on the display section, wherein when the number of the changed elements is greater than a predetermined count, the control section controls not to display the changed elements at predetermined position, and wherein the changed element is changed content of the Web page information.

* * * * *